(12) United States Patent
Yamazaki

(10) Patent No.: US 7,244,010 B2
(45) Date of Patent: Jul. 17, 2007

(54) IMAGE PROCESSING METHOD AND APPARATUS, AND IMAGE FORMING APPARATUS

(75) Inventor: Yoshirou Yamazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 286 days.

(21) Appl. No.: 11/092,638

(22) Filed: Mar. 30, 2005

(65) Prior Publication Data
US 2005/0219295 A1 Oct. 6, 2005

(30) Foreign Application Priority Data
Mar. 31, 2004 (JP) ............................. 2004-107854

(51) Int. Cl.
*B41J 2/205* (2006.01)
(52) U.S. Cl. .......................................... 347/15; 347/43
(58) Field of Classification Search ...................... None
See application file for complete search history.

(56) References Cited

U.S. PATENT DOCUMENTS 5,831,642 A * 11/1998 Matsubara et al. ............. 347/9
6,783,204 B1 * 8/2004 Kanayama et al. ........... 347/19

FOREIGN PATENT DOCUMENTS

JP 8-214159 A 8/1996

* cited by examiner

*Primary Examiner*—Thinh Nguyen
(74) *Attorney, Agent, or Firm*—Birch, Stewart, Kolasch & Birch, LLP

(57) ABSTRACT

The image processing method for specifying dot arrangements for respective ink components according to image data, when forming an image on a recording medium by means of dots of inks of n colors, where n is any positive integer, the method comprises the steps of: calculating color correlation and spatial frequency components from the image data; specifying a dot overlap function for controlling overlapping between dots of the ink components, according to the calculated color correlation and spatial frequency components; calculating an ink recording rate of each of the inks from the image data; specifying the dot arrangement of a first ink component by means of a prescribed method, according to the ink recording rate; and determining a dot arrangement for the inks of the n colors, in such a manner that, taking k to be an integer where $2 \leq k \leq n$, the dot arrangement of the kth ink component is specified according to the ink recording rate of the kth ink component, and the previously specified dot arrangement and dot overlap function of the first ink component through to the (k-1)th ink component.

17 Claims, 30 Drawing Sheets

FIG.7

| COLOR CORRELATION | LOW FREQUENCY | MEDIUM FREQUENCY | HIGH FREQUENCY |
|---|---|---|---|
| HIGH (GRAY) | STATE 1 | STATE 2 | STATE 3 |
| MEDIUM | STATE 1 | STATE 1 | STATE 2 |
| LOW | STATE 1 | STATE 1 | STATE 1 |

C

C

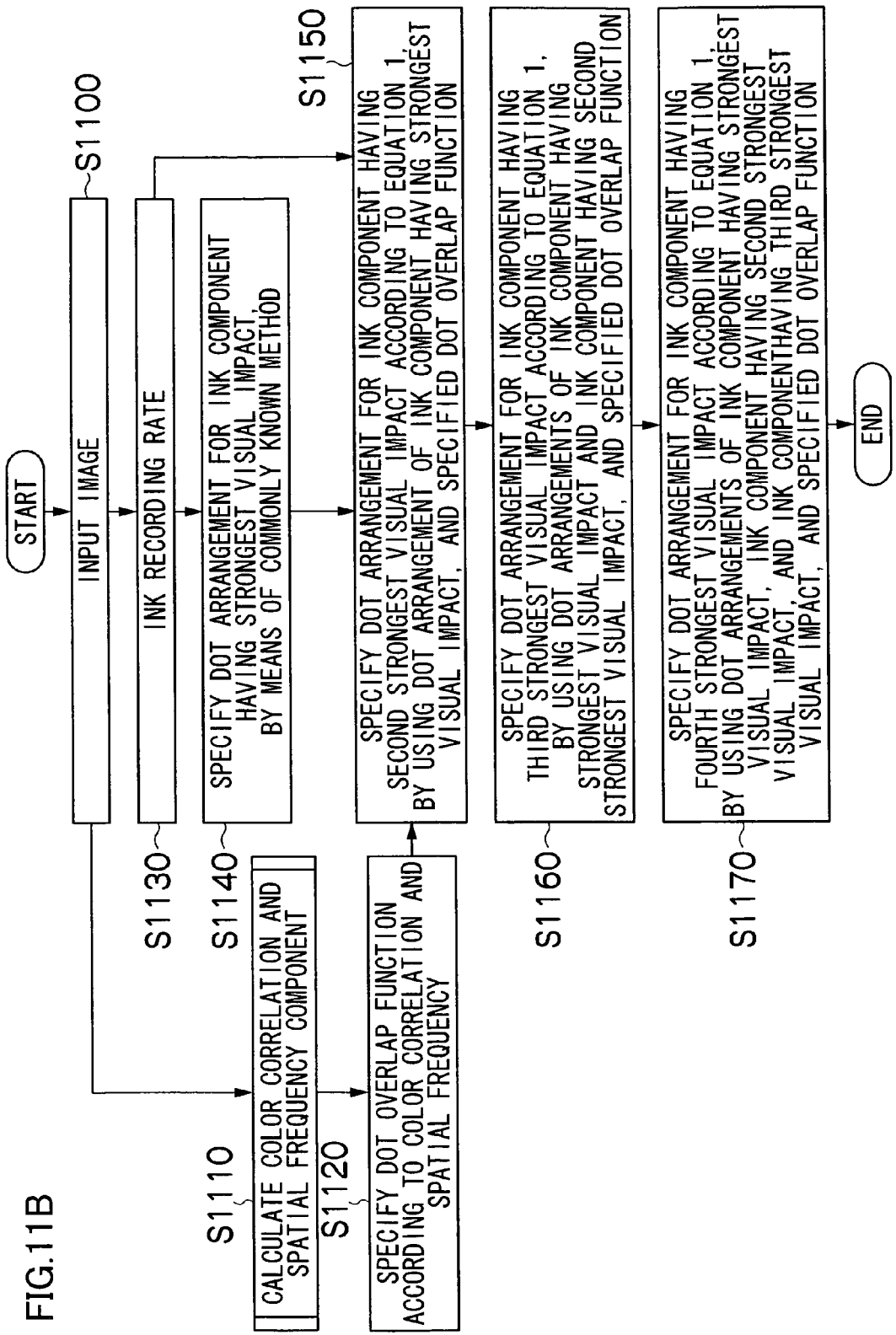

FIG.16

| COLOR CORRELATION | SPATIAL FREQUENCY | CONTENT |
|---|---|---|
| HIGH | LOW | THRESHOLD VALUE MATRIX 1 |
| MEDIUM | MEDIUM | THRESHOLD VALUE MATRIX 2 |
| LOW | HIGH | THRESHOLD VALUE MATRIX 3 |
| ... | ... | ... |
| ... | ... | ... |
| ... | ... | ... |

LOW FREQUENCY LM

| 2 | 194 | 34 | 226 | 10 | 202 | 42 | 234 |
|---|---|---|---|---|---|---|---|
| 130 | 66 | 162 | 98 | 138 | 74 | 170 | 106 |
| 50 | 242 | 18 | 210 | 58 | 250 | 26 | 218 |
| 178 | 114 | 146 | 82 | 186 | 122 | 154 | 90 |
| 14 | 206 | 46 | 238 | 6 | 198 | 88 | 230 |
| 142 | 78 | 174 | 110 | 134 | 70 | 168 | 102 |
| 62 | 254 | 30 | 222 | 54 | 246 | 22 | 214 |
| 190 | 126 | 158 | 94 | 182 | 118 | 150 | 88 |

FIG.17A

MEDIUM FREQUENCY MM

| 8 | 136 | 40 | 168 |
|---|---|---|---|
| 200 | 72 | 232 | 104 |
| 56 | 184 | 24 | 152 |
| 248 | 120 | 216 | 88 |

FIG.17B

HIGH FREQUENCY HM

| 32 | 160 |
|---|---|
| 224 | 96 |

| COLOR SPACE COORDINATES | | | SPATIAL FREQUENCY COMPONENT OF COLOR COMPONENT USED FOR JUDGMENT | | | |
|---|---|---|---|---|---|---|
| L | a | b | LOW FREQUENCY COMPONENT | MEDIUM FREQUENCY COMPONENT | HIGH FREQUENCY COMPONENT | |
| 30 | −20 | 0 | DOT OVERLAP FUNCTION 1 | DOT OVERLAP FUNCTION 2 | DOT OVERLAP FUNCTION 3 | ... |
| ... | ... | ... | ... | ... | ... | |

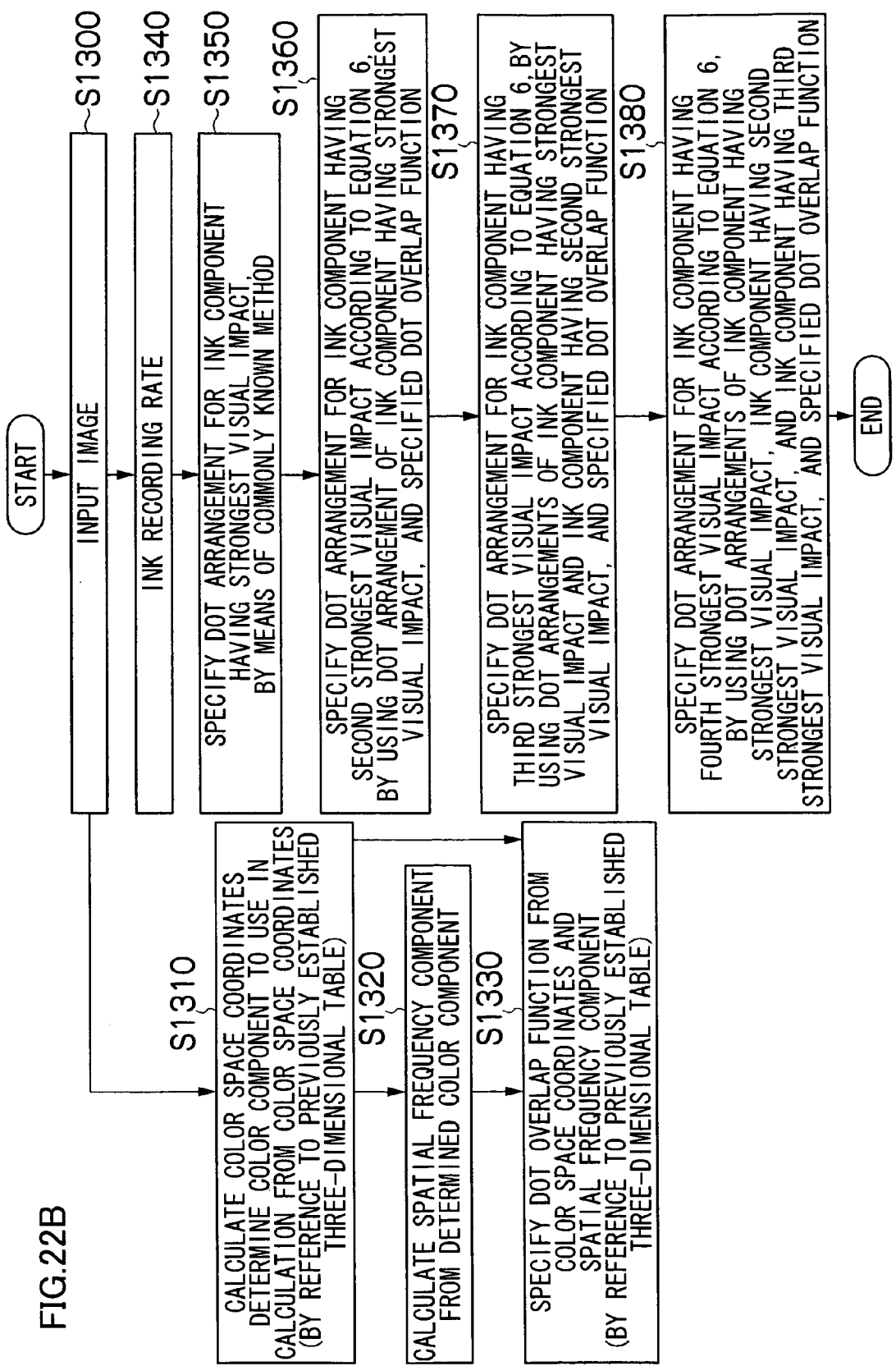

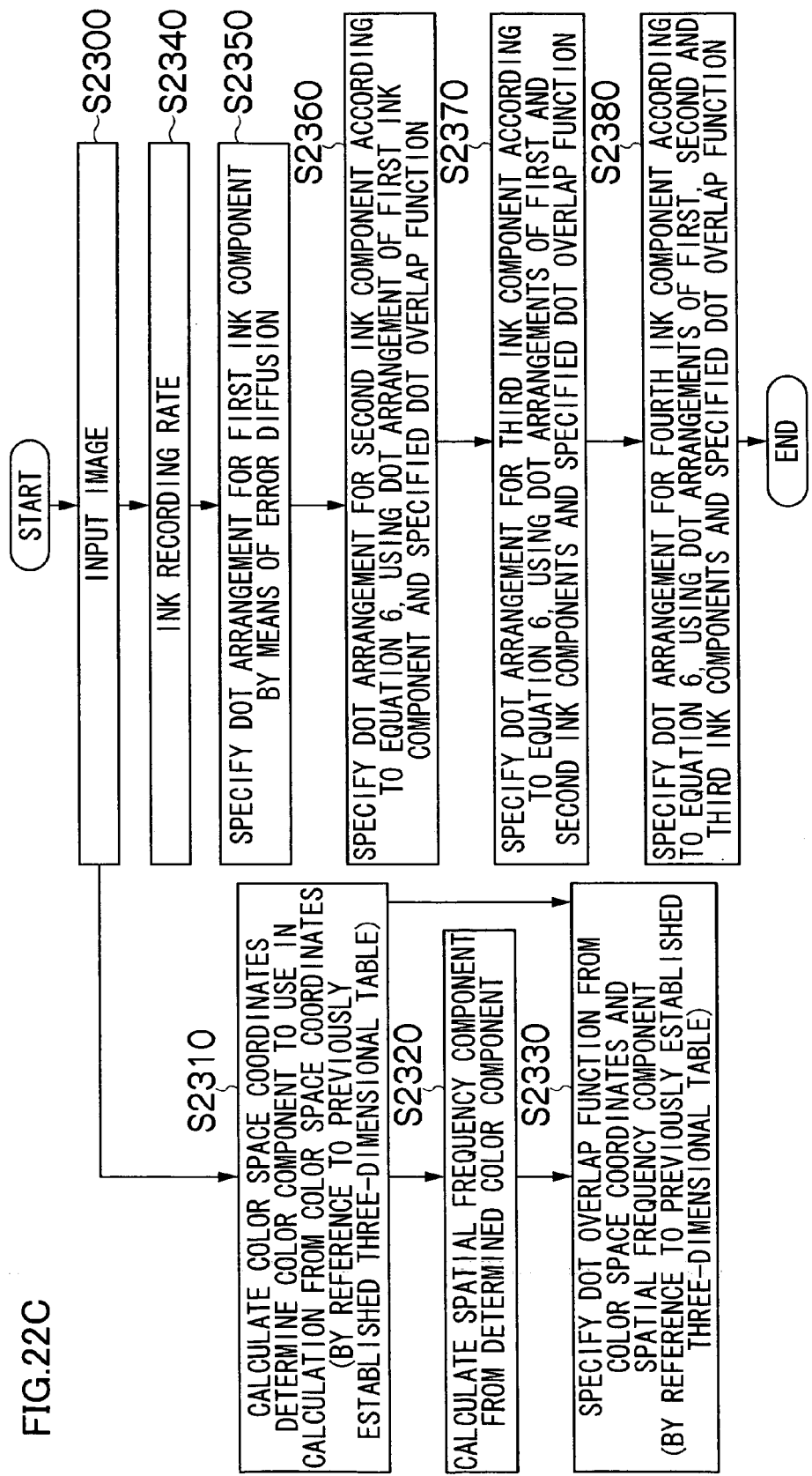

FIG.24

| COLOR SPACE COORDINATES | | SPATIAL FREQUENCY COMPONENT OF COLOR COMPONENT USED FOR JUDGMENT | CONTENT |
|---|---|---|---|
| L | a | b | | |
| 30 | −20 | 0 | LOW | THRESHOLD VALUE MATRIX 1 |
| ... | ... | ... | MID | THRESHOLD VALUE MATRIX 2 |
| ... | ... | ... | HIGH | THRESHOLD VALUE MATRIX 3 |
| ... | ... | ... | ... | ... |

IMAGE PROCESSING METHOD AND APPARATUS, AND IMAGE FORMING APPARATUS

BACKGROUND OF THE INVENTION

1. Field of the Invention

The present invention relates to an image processing method and image processing apparatus, and to an image forming apparatus comprising same, and more particularly, to an image processing method and image processing apparatus, and an image forming apparatus comprising same, whereby both image resolution and tonal gradation can be achieved simultaneously when forming an image by means of dots using a plurality of inks.

2. Description of the Related Art

In the related art, an image forming apparatus is known in which images are formed by outputting a plurality of colors onto a recording medium by means of a coloring material, such as ink, toner, or the like. In an image forming apparatus of this kind, images are formed by means of a plurality of dots formed by means of ink, toner, or the like. Therefore, an image is reproduced according to whether or not dots are present on a recording medium, such as white paper. Since the number of inks used is limited, conventionally, a half-toning method is known which is used to represent continuous tonal gradation by means of a limited number of inks.

On the other hand, in many cases, the image data inputted to an image forming apparatus is multiple-value image data. Therefore, when an image represented by multiple-value image data of this kind is outputted to an image forming apparatus such as that described above, it is necessary to convert the multiple-value image data into binary image data.

Conventionally, a technique such as error diffusion or dithering is used to convert multiple-value image data into binary image data, and various methods based on these techniques have been proposed for obtaining satisfactory binary image data.

For example, a method is known in which the spatial frequency or a characteristic quantity corresponding to same is sampled for each pixel of the input image, and an optimal error diffusion matrix is selected, if error diffusion is being used, or an optimal threshold value matrix is selected, if dithering is being used, in accordance with the characteristic quantity. In this way, suitable binary image data which satisfies human visual perception characteristics is obtained (see, for example, Japanese Patent Application Publication No. 8-214159).

However, Japanese Patent Application Publication No. 8-214159 provides no disclosure at all regarding methods for using a plurality of inks. The characteristics of human visual perception indicate high sensitivity to spatial frequency in respect of achromatic colors and low sensitivity to spatial frequency in respect of chromatic colors. Therefore, it is necessary to obtain a binary image which satisfies human visual perception in respect of a plurality of inks representing chromatic colors, in particular.

However, in the method described in Japanese Patent Application Publication No. 8-214159, there is no disclosure regarding use of a plurality of inks and although overlapping between a plurality of inks is controlled in conventional half-toning technology in order to improve color reproduction and granularity, no technology is currently known for controlling overlapping between a plurality of inks with the object of achieving compatibility of image resolution and tonal gradation.

SUMMARY OF THE INVENTION

The present invention has been contrived with the foregoing circumstances in view, an object thereof being to provide an image processing method, an image processing apparatus, and an image forming apparatus using same, whereby both image resolution and tonal gradation (color image reproducibility) can be achieved in a compatible fashion, when reproducing an image by using a plurality of inks.

In order to attain the aforementioned object, the present invention is directed to an image processing method for specifying dot arrangements for respective ink components according to image data, when forming an image on a recording medium by means of dots of inks of n colors, where n is any positive integer, the method comprising the steps of: calculating color correlation and spatial frequency components from the image data; specifying a dot overlap function for controlling overlapping between dots of the ink components, according to the calculated color correlation and spatial frequency components; calculating an ink recording rate of each of the inks from the image data; specifying the dot arrangement of a first ink component by means of a prescribed method, according to the ink recording rate; and determining a dot arrangement for the inks of the n colors, in such a manner that, taking k to be an integer where $2 \leq k \leq n$, the dot arrangement of the kth ink component is specified according to the ink recording rate of the kth ink component, and the previously specified dot arrangement and dot overlap function of the first ink component through to the (k−1)th ink component.

Thereby, it is possible to achieve both tonal gradation and image resolution, by using a plurality of inks.

Preferably, the first ink component is an ink component of the color having a strongest visual impact. Accordingly, by specifying the dot arrangement firstly for the color having the strongest visual impact, it is possible to achieve the most desirable arrangement of the dots of the color having the strongest visual impact.

Preferably, the first ink component is magenta. If the ink components are yellow (Y), magenta (M) and cyan (C), then the color having the strongest visual impact is magenta, followed by cyan, and finally yellow. Therefore, the dot arrangement is specified for magenta first.

Preferably, the prescribed method for specifying the dot arrangement of the first ink component is an error diffusion method. By using error diffusion, it is possible to control the overlap between inks to a desired level, while maintaining average density, which is a characteristic feature of this method.

In order to attain the aforementioned object, the present invention is also directed to an image processing method for specifying dot arrangements for respective ink components according to image data, when forming an image on a recording medium by means of dots of inks of n colors, where n is any positive integer, the method comprising the steps of: calculating color correlation and spatial frequency components from the image data; specifying a threshold value matrix corresponding to each of the ink components which controls the dot arrangement of each of the ink components according to the calculated color correlation and spatial frequency components; calculating an ink recording rate of each of the inks from the image data; and specifying a dot arrangement for each of the ink components according to the ink recording rate and the threshold value matrix.

By specifying the dot arrangement by means of a threshold value matrix, it is possible to achieve half-toning, which yields both tonal gradation and image resolution.

In order to attain the aforementioned object, the present invention is also directed to an image processing method for specifying dot arrangements for respective ink components according to image data, when forming an image on a recording medium by means of dots of inks of n colors, where n is any positive integer, the method comprising the steps of: calculating color space coordinates and spatial frequency components from the image data; specifying a dot overlap function for controlling overlapping between dots of the ink components, according to the calculated color space coordinates and spatial frequency components; calculating an ink recording rate of each of the inks from the image data; specifying the dot arrangement of a first ink component by means of a prescribed method, according to the ink recording rate; and determining a dot arrangement for the inks of the n colors, in such a manner that, taking k to be an integer where $2 \leq k \leq n$, the dot arrangement of the kth ink component is specified according to the ink recording rate of the kth ink component, and the previously specified dot arrangement and dot overlap function of the first ink component through to the (k−1)th ink component.

Even if the dot overlap function is specified by using the color space coordinates instead of the color correlation value, it is still possible to achieve both tonal gradation and image resolution, similarly to a case where the color correlation is used.

Preferably, the first ink component is an ink component of the color having a strongest visual impact.

Preferably, the prescribed method for specifying the dot arrangement of the first ink component is an error diffusion method.

In order to attain the aforementioned object, the present invention is also directed to an image processing method for specifying dot arrangements for respective ink components according to image data, when forming an image on a recording medium by means of dots of inks of n colors, where n is any positive integer, the method comprising the steps of: calculating color space coordinates and spatial frequency components from the image data; specifying a threshold value matrix corresponding to each of the ink components which controls the dot arrangement of each of the ink components according to the calculated color space coordinates and spatial frequency components; calculating an ink recording rate of each of the inks from the image data; and specifying a dot arrangement for each of the ink components according to the ink recording rate and the threshold value matrix.

Even if a threshold value matrix is specified by using the color space coordinates instead of the color correlation value, it is still possible to achieve both tonal gradation and image resolution, similarly to a case where color correlation is used; in fact, higher image quality is obtained where the color space coordinates are used.

In order to attain the aforementioned object, the present invention is also directed to an image processing apparatus for specifying dot arrangements for respective ink components according to image data, when forming an image on a recording medium by means of dots of inks of n colors, where n is any positive integer, the apparatus comprising: a color correlation calculation device which calculates color correlation from the image data; a spatial frequency component calculation device which calculates spatial frequency components from the image data; a dot overlap function specification device which specifies a dot overlap function for controlling overlapping between dots of the ink components, according to the calculated color correlation and spatial frequency components; an ink recording rate calculation device which calculates an ink recording rate of each of the inks from the image data; and a dot arrangement specification device which specifies the dot arrangement of a first ink component by means of a prescribed method according to the ink recording rate, and the dot arrangement of the first ink component from the ink recording rate by means of a prescribed method, and specifies a dot arrangement for the inks of the n colors, in such a manner that, taking k to be an integer where $2 \leq k \leq n$, the dot arrangement of the kth ink component is specified according to the ink recording rate of the kth ink component, and the previously specified dot arrangement and dot overlap function of the first ink component through to the (k−1)th ink component.

More specifically, by means of this composition of an apparatus, it is possible to implement the image processing method according to the present invention as described above, and an image which achieves both tonal gradation and image resolution can be obtained by using a plurality of inks.

In order to attain the aforementioned object, the present invention is also directed to an image processing apparatus for specifying dot arrangements for respective ink components according to image data, when forming an image on a recording medium by means of dots of inks of n colors, where n is any positive integer, the apparatus comprising: a color correlation calculation device which calculates color correlation from the image data; a spatial frequency component calculation device which calculates spatial frequency components from the image data; a threshold value matrix specification device which specifies a threshold value matrix corresponding to each of the ink components which controls the dot arrangement of each of the ink components according to the calculated color correlation and spatial frequency components; an ink recording rate calculation device which calculates an ink recording rate of each of the inks from the image data; and a dot arrangement specification device which specifies a dot arrangement for each of the ink components according to the ink recording rate and the threshold value matrix.

Thereby, the image processing method according to the present invention is implemented.

In order to attain the aforementioned object, the present invention is also directed to an image processing apparatus for specifying dot arrangements for respective ink components according to image data, when forming an image on a recording medium by means of dots of inks of n colors, where n is any positive integer, the apparatus comprising: a color space coordinate calculation device which calculates color space coordinates from the image data; a spatial frequency component calculation device which calculates spatial frequency components from the color space coordinates; a dot overlap function specification device which specifies a dot overlap function for controlling overlapping between dots of the ink components, according to the color space coordinates and spatial frequency components; an ink recording rate calculation device which calculates an ink recording rate of each of the inks from the image data; and a dot arrangement specification device which specifies the dot arrangement of a first ink component by means of a prescribed method according to the ink recording rate, and the dot arrangement of the first ink component from the ink recording rate by means of a prescribed method, and specifies a dot arrangement for the inks of the n colors, in such a manner that, taking k to be an integer where $2 \leq k \leq n$, the dot arrangement of the kth ink component is specified according to the ink recording rate of the kth ink component, and the previously specified dot arrangement and dot overlap function of the first ink component through to the (k−1)th ink component.

Thereby, the image processing method according to the present invention is implemented.

In order to attain the aforementioned object, the present invention is also directed to an image processing apparatus for specifying dot arrangements for respective ink components according to image data, when forming an image on a recording medium by means of dots of inks of n colors, where n is any positive integer, the apparatus comprising: a color space coordinate calculation device which calculates color space coordinates from the image data; a spatial frequency component calculation device which calculates spatial frequency components from the color space coordinates; a threshold value matrix specification device which specifies a threshold value matrix corresponding to each of the ink components which controls the dot arrangement of each of the ink components according to the color space coordinates and spatial frequency components; an ink recording rate calculation device which calculates an ink recording rate of each of the inks from the image data; and a dot arrangement specification device which specifies a dot arrangement for each of the ink components according to the ink recording rate and the threshold value matrix.

Thereby, the image processing method according to the present invention is implemented.

In order to attain the aforementioned object, the present invention is also directed to an image forming apparatus, comprising the above-described image processing apparatus. Thereby, it is possible to obtain high-quality image recording in which tonal gradation and resolution are achieved, using a plurality of inks.

According to the image processing method and image processing apparatus according to the present invention, and the image forming apparatus comprising same, as described above, it is possible to achieve both image resolution and tonal gradation by controlling ink overlap (dot overlap) for a plurality of inks, according to the spatial frequency component and the color correlation of the original image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 7 is an illustrative diagram showing one example of a dot overlap function specification table according to a first embodiment;

FIG. 8A is an oblique view and FIG. 8B is a cross-sectional view;

FIG. 9A is an oblique view and FIG. 9B is a cross-sectional view;

FIG. 10A is an oblique view and FIG. 10B is a cross-sectional view;

FIG. 11B is a flowchart showing an example of a case where the first ink component in FIG. 11A is taken to be the ink component having the strongest visual impact;

FIG. 16 is an illustrative diagram showing one example of a threshold value matrix specification table according to a second embodiment;

FIGS. 17A to 17C are illustrative diagrams showing an example of a threshold value matrix; wherein FIG. 17A is a low-frequency matrix; FIG. 17B is a medium-frequency matrix; and FIG. 17C is a high-frequency matrix;

FIGS. 18A to 18C are illustrative diagrams showing an example where the threshold value matrices are converted to the same size; wherein FIG. 18A is a low-frequency matrix; FIG. 18B is a medium-frequency matrix; and FIG. 18C is a high-frequency matrix;

FIG. 21 is an illustrative diagram showing one example of a dot overlap function specification table according to a third embodiment of the present invention;

FIG. 22B is a flowchart showing an example of a case where the first ink component in FIG. 22A is taken to be the ink component having the strongest visual impact;

FIG. 22C is a flowchart showing an example of a case where the dot arrangement of the first ink component in FIG. 22A is specified by means of an error diffusion method;

FIG. 24 is an illustrative diagram showing one example of a threshold value matrix specification table according to a fourth embodiment.

DETAILED DESCRIPTION OF THE PREFERRED EMBODIMENTS

Figure 1:
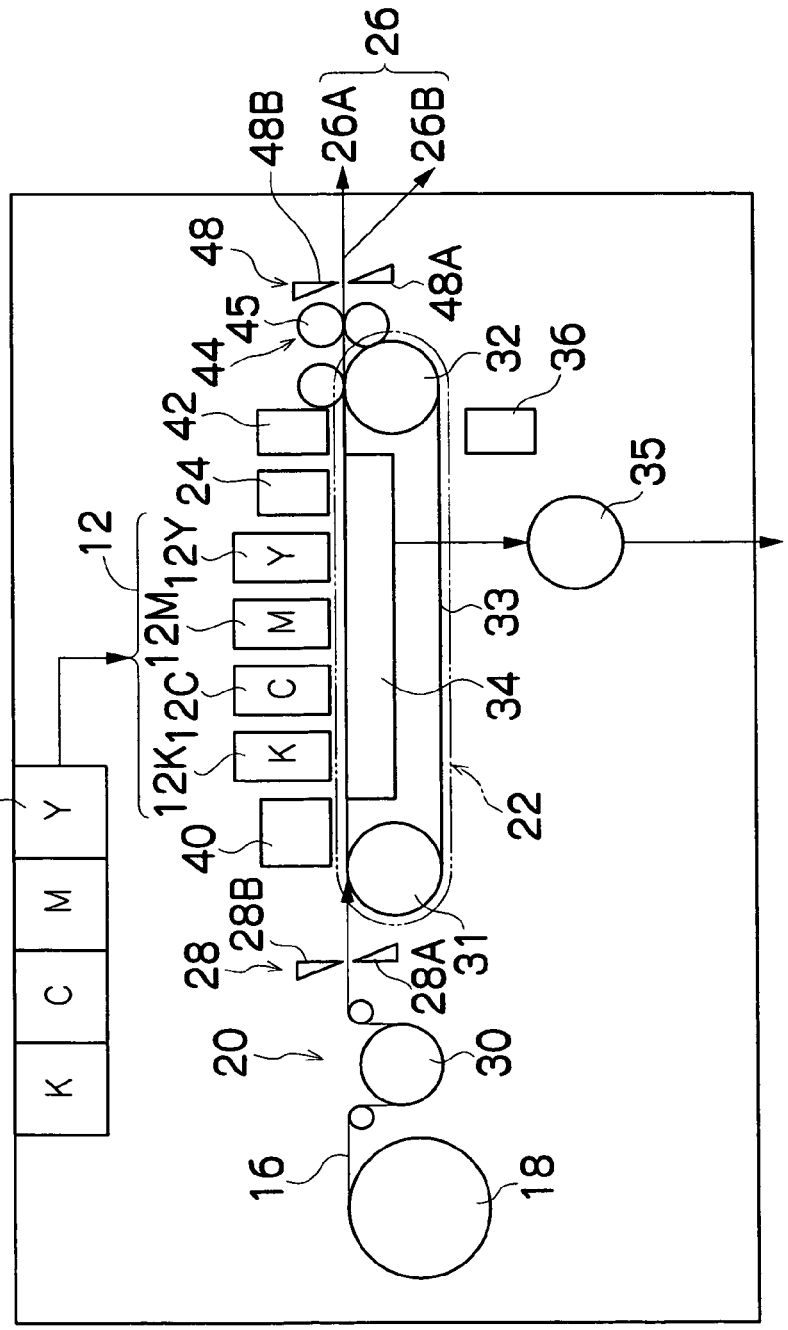
FIG. 1 is a general schematic drawing of an inkjet recording apparatus according to an embodiment of the present invention.

FIG. 1 is a general schematic drawing of an inkjet recording apparatus according to an embodiment of the present invention.

As shown in FIG. 1, the inkjet recording apparatus 10 comprises: a printing unit 12 having a plurality of print heads 12K, 12C, 12M, and 12Y for ink colors of black (K), cyan (C), magenta (M), and yellow (Y), respectively; an ink storing a loading unit 14 for storing inks to be supplied to the print heads 12K, 12C, 12M, and 12Y; a paper supply unit 18 for supplying recording paper 16; a decurling unit 20 for removing curl in the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

In FIG. 1, a single magazine for rolled paper (continuous paper) is shown as an example of the paper supply unit 18; however, a plurality of magazines with paper differences such as paper width and quality may be jointly provided. Moreover, paper may be supplied with a cassette that contains cut paper loaded in layers and that is used jointly or in lieu of a magazine for rolled paper.

In the case of the configuration in which roll paper is used, a cutter (first cutter) 28 is provided as shown in FIG. 1, and the continuous paper is cut into a desired size by the cutter 28. The cutter 28 has a stationary blade 28A, whose length is equal to or greater than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut paper is used, the cutter 28 is not required.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and the suction chamber 34 provides suction with a fan 35 to generate a negative pressure, and the recording paper 16 is held on the belt 33 by suction.

The belt 33 is driven in the clockwise direction in FIG. 1 by the motive force of a motor (not shown) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not depicted, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
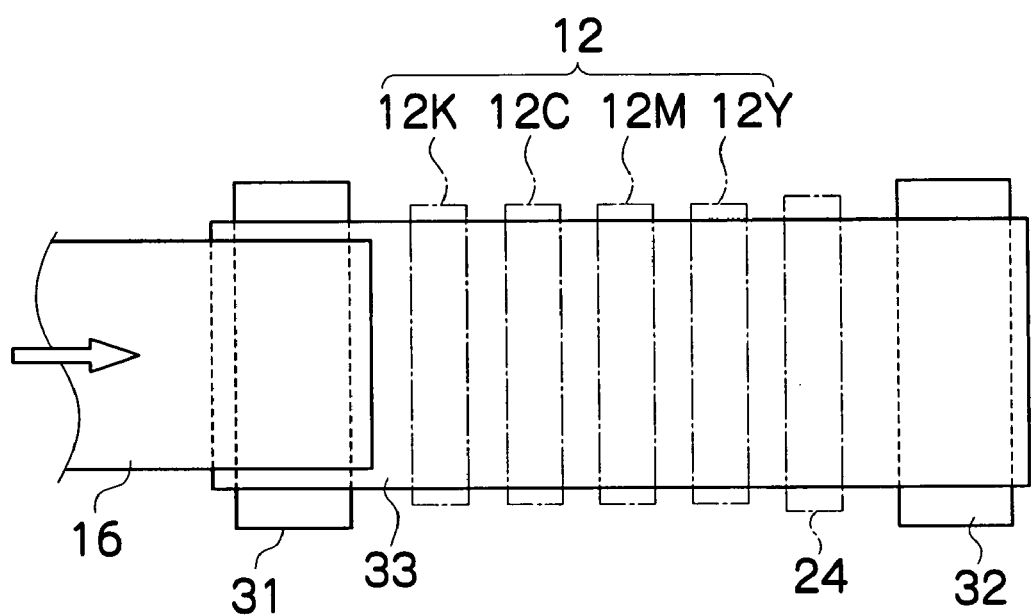
FIG. 2 is a plan view of principal components of an area around a printing unit of the inkjet recording apparatus in FIG. 1.

The printing unit 12 includes the print heads 12K, 12C, 12M, and 12Y corresponding to four ink colors (KCMY), and forms a so-called full-line head in which each of the print heads 12K, 12C, 12M, and 12Y is disposed longitudinally in the paper width direction (main scanning) perpendicular to the paper conveyance direction (sub-scanning) among a length that corresponds to the maximum paper width, as referred in FIG. 2.

As shown in FIG. 2, each of the print heads 12K, 12C, 12M, and 12Y is composed of a line head, in which a plurality of ink-droplet ejection apertures (nozzles) are arranged along a length that exceeds at least one side of the maximum-size recording paper 16 intended for use in the inkjet recording apparatus 10.

The print heads 12K, 12C, 12M, and 12Y are arranged in this order from the upstream side along the delivering direction of the recording paper 16 (hereinafter referred to as the paper conveyance direction). A color print can be formed on the recording paper 16 by ejecting the inks from the print heads 12K, 12C, 12M, and 12Y, respectively, onto the recording paper 16 while conveying the recording paper 16.

Although the configuration with the KCMY four standard colors is described in the present embodiment, combinations of the ink colors and the number of colors are not limited to those, and light and/or dark inks can be added as required. For example, a configuration is possible in which print heads for ejecting light-colored inks such as light cyan and light magenta are added.

The printing unit 12, in which the full-line heads covering the entire width of the paper are thus provided for the respective ink colors, can record an image over the entire surface of the recording paper 16 by performing the action of moving the recording paper 16 and the printing unit 12 relatively to each other in the sub-scanning direction just once (i.e., with a single sub-scan). Higher-speed printing is thereby made possible and productivity can be improved in comparison with a shuttle type head configuration in which a print head reciprocates in the main scanning direction.

As shown in FIG. 1, the ink storing/loading unit 14 has tanks for storing the inks to be supplied to the print heads 12K, 12C, 12M, and 12Y, and the tanks are connected to the print heads 12K, 12C, 12M, and 12Y through channels (not shown), respectively. The ink storing/loading unit 14 has a warning device (e.g., a display device, an alarm sound generator) for warning when the remaining amount of any ink is low, and has a mechanism for preventing loading errors among the colors.

The print determination unit 24 has an image sensor for capturing an image of the ink-droplet deposition result of the print unit 12, and functions as a device to check for ejection defects such as clogs of the nozzles in the print unit 12 from the ink-droplet deposition results evaluated by the image sensor (line sensor).

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements, which are arranged two-dimensionally.

The print determination unit 24 reads a test pattern printed with the print heads 12K, 12C, 12M, and 12Y for the respective colors, and the ejection of each head is determined. The ejection determination includes the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in the diagram, a sorter for collecting prints according to print orders is provided to the paper output unit 26A for the target prints.

In the present embodiment, each of the print heads 12K, 12C, 12M, and 12Y is explained as a full-line head in which a plurality of ink-droplet ejection apertures (nozzles) are arranged along a length that exceeds at least one side of the maximum-size recording paper 16 intended for use in the inkjet recording apparatus 10. Although not shown in the diagram, the full-line head can be composed of a plurality of short two-dimensionally arrayed heads arranged in the form of a staggered matrix and combined so as to form nozzle rows having lengths that correspond to the entire width of the recording paper 16.

Next, the structure of the print heads is described. The print heads 12K, 12C, 12M and 12Y have the same structure, and a reference numeral 50 is hereinafter designated to any of the print heads 12K, 12C, 12M and 12Y.

Figure 3:
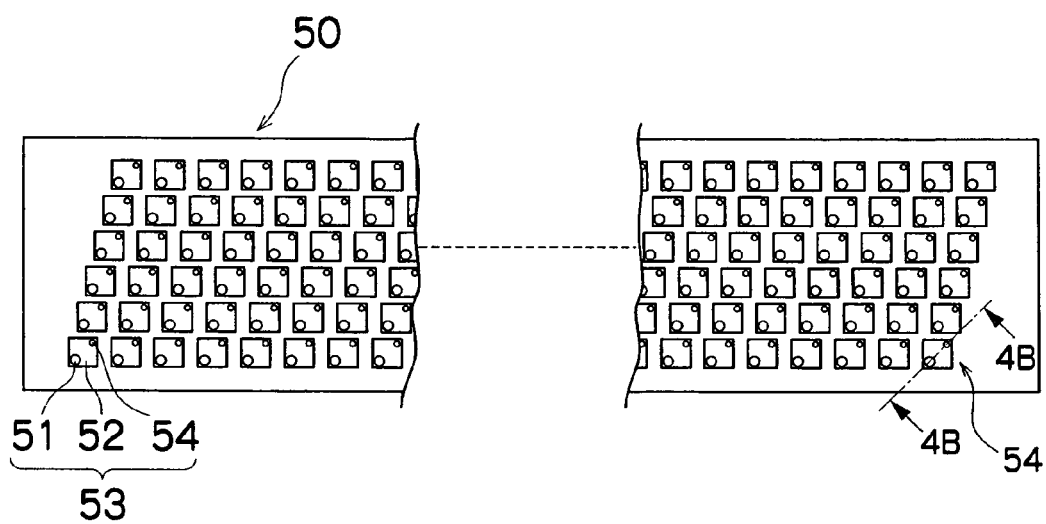
FIG. 3 is a perspective plan view showing an example of a configuration of a print head.

FIG. 3 is a perspective plan view showing an example of the configuration of the print head 50. As shown in FIG. 3, the print head 50 in the present embodiment is composed of a plurality of ink chamber units 54 comprising: nozzles 51 for ejecting ink-droplets; pressure chambers 52 for giving pressure to the ink when ejecting; and a supply port 53 for supplying the ink to the pressure chambers 52 through a common channel (not shown). The ink chamber units 54 are disposed in the form of a staggered matrix, and the effective nozzle pitch is thereby made small.

As shown in FIG. 3, the planar shape of the pressure chamber 52 provided for each nozzle 51 is substantially a square, and the nozzle 51 and the supply port 53 are disposed in both corners on a diagonal line of the square. Each pressure chamber 52 is connected to a common channel (not shown) through the supply port 53. The ink is delivered from the common channel to the pressure chamber 52 through the supply port 53, and the pressure chamber 52 is deformed by applying pressure from an actuator or the like (not shown) so as to eject the ink from the nozzle 51 to the recording paper 16.

Figure 4:
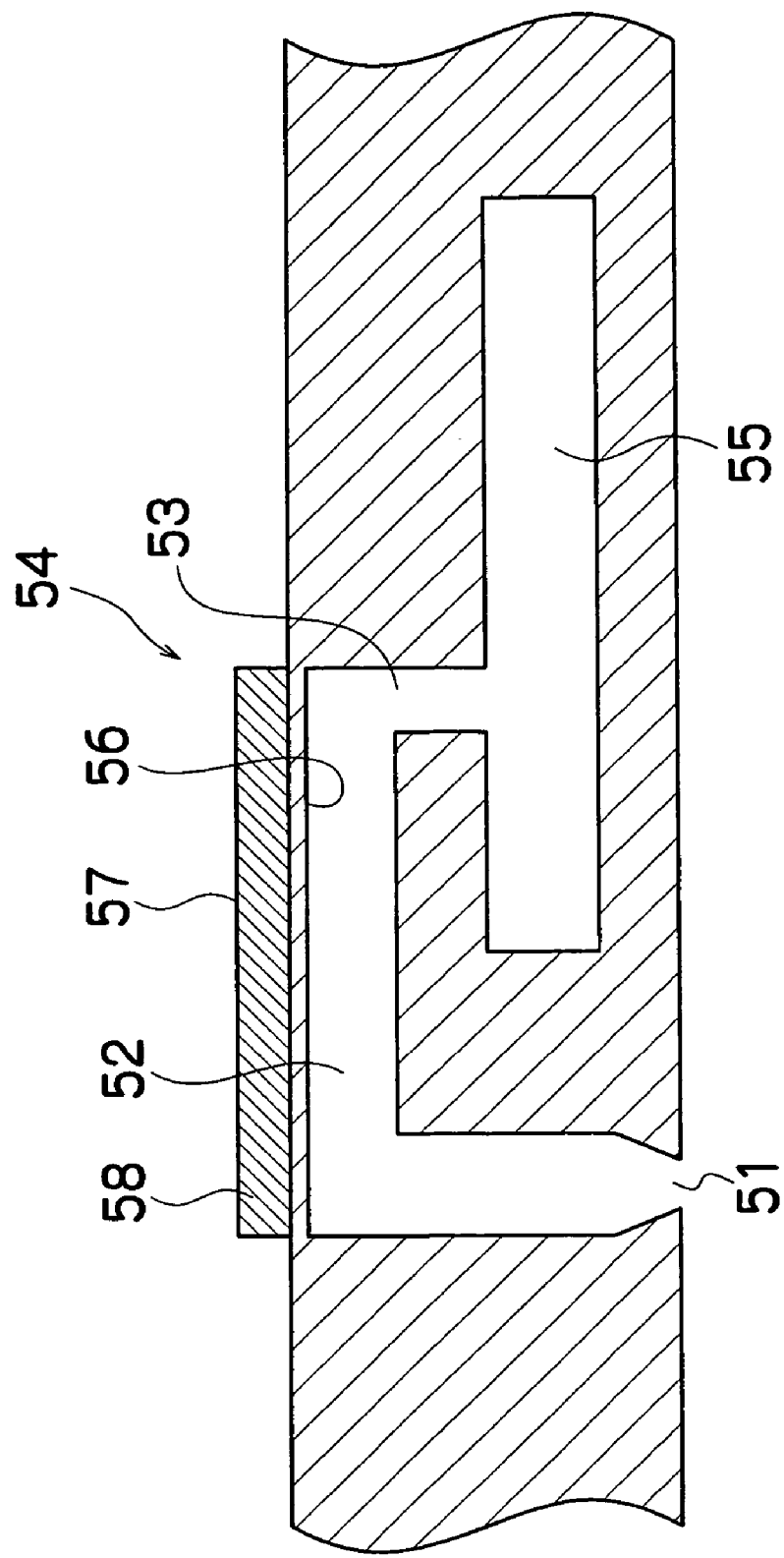
FIG. 4 is a cross-sectional view along a line 4A-4B in FIG. 3.

FIG. 4 is a cross-sectional view taken along the line 4A-4B in FIG. 3, showing the inner structure of a pressure chamber unit 54.

As shown in FIG. 4, the pressure chamber unit 54 is formed a vibration plate 56 on the ceiling of the pressure chamber 52, and a piezoelectric element 58 is formed thereon. In addition, a discrete electrode 57 is formed on the piezoelectric element 58, and the vibration plate 56 also serves as a common electrode. Since the piezoelectric element 58 is deformed by applying drive voltage to the discrete electrode 57, the volume of the pressure chamber 52 is reduced, so that the ink is ejected from the nozzle 51. When ink is ejected, new ink is delivered from the common flow channel 55 through the supply port 54 to the pressure chamber 52.

Figure 5:
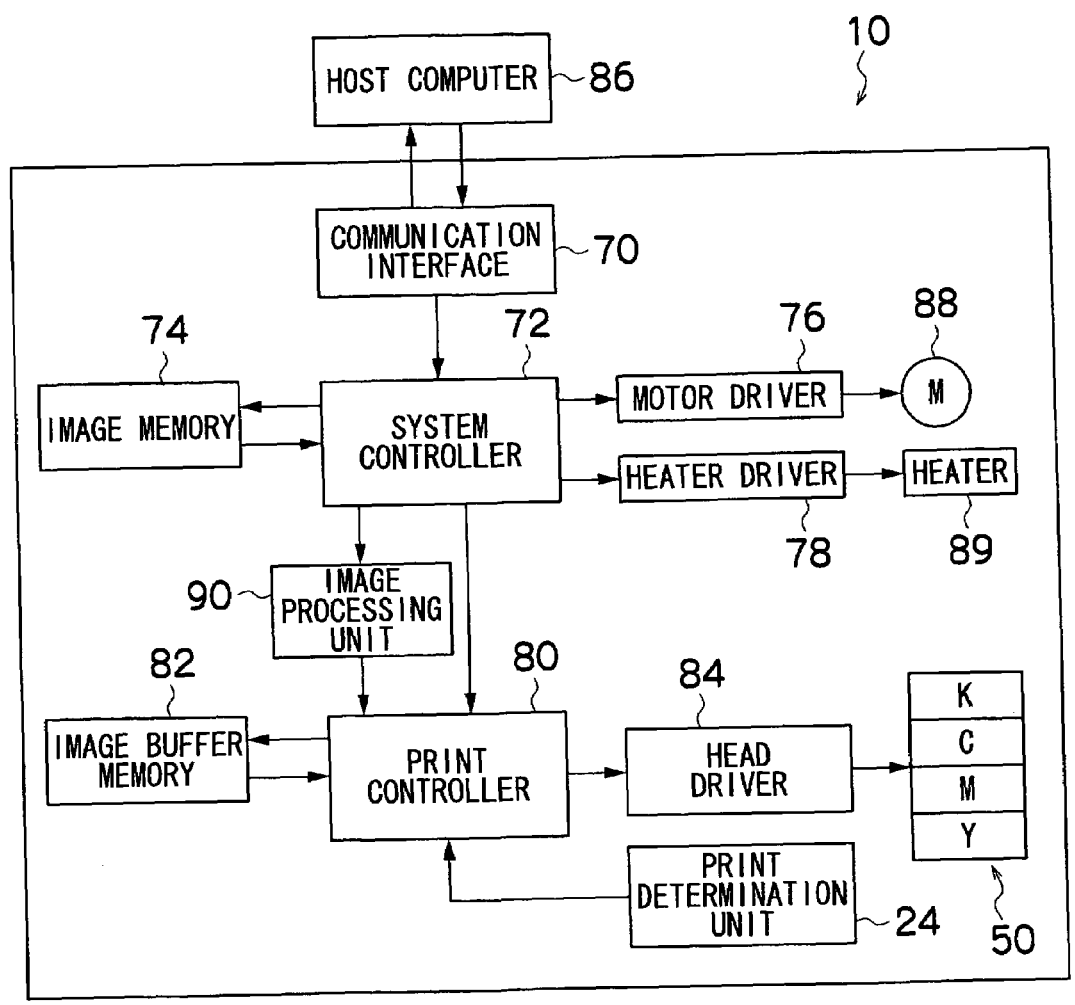
FIG. 5 is a block diagram of principal components showing a system configuration of the inkjet recording apparatus in FIG. 1.

FIG. 5 is a block diagram of the principal components showing the system configuration of the inkjet recording apparatus 10. The inkjet recording apparatus 10 has a communication interface 70, a system controller 72, an image memory 74, a motor driver 76, a heater driver 78, a print controller 80, an image buffer memory 82, a head driver 84, and other components.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to memory composed of a semiconductor element, and a hard disk drive or another magnetic medium may be used.

The system controller 72 controls the communication interface 70, image memory 74, motor driver 76, heater driver 78, and other components. The system controller 72 has a central processing unit (CPU), peripheral circuits therefor, and the like. The system controller 72 controls communication between itself and the host computer 86, controls reading and writing from and to the image memory 74, and performs other functions, and also generates control signals for controlling a heater 89 and the motor 88 in the conveyance system.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to apply the generated print control signals (print data) to the head driver 84. Required signal processing is performed in the print controller 80, and the ejection timing and ejection amount of the ink-droplets from the print head 50 are controlled by the head driver 84 according to the image data. Desired dot sizes and dot placement can be brought about thereby.

The print controller 80 is provided with the image buffer memory 82; and image data, parameters, and other data are temporarily stored in the image buffer memory 82 when image data is processed in the print controller 80. The aspect shown in FIG. 7 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives actuators for the print heads 12K, 12C, 12M, and 12Y of the respective colors according to the print data received from the print controller 80. A feedback control system for keeping the drive conditions for the print heads constant may be included in the head driver 84.

Furthermore, in the present embodiment, the inkjet recording apparatus 10 also comprises, in addition to the foregoing, an image processing unit 90 which forms an image processing apparatus for controlling the overlap between a plurality of inks (dot overlap) with the aim of achieving both image resolution and tonal gradation in a mutually compatible fashion.

In FIG. 5, the image processing unit 90 is depicted as a separate device from the system control 72 and the print controller 80, for the sake of convenience, but the image processing unit 90 may be incorporated in the system controller 72 or the print controller 80, for example, forming a portion of same.

The image processing unit 90 calculates the ink (dot) recording rate and the spatial frequency component, and other values, from the input image data, and it decides the dot arrangement of the inks of respective colors according to the obtained image data. There are various methods which the image processing unit 90 may use to decide the dot arrangement, and various modes of the image processing unit 90 are described below as respective embodiments.

Figure 6:
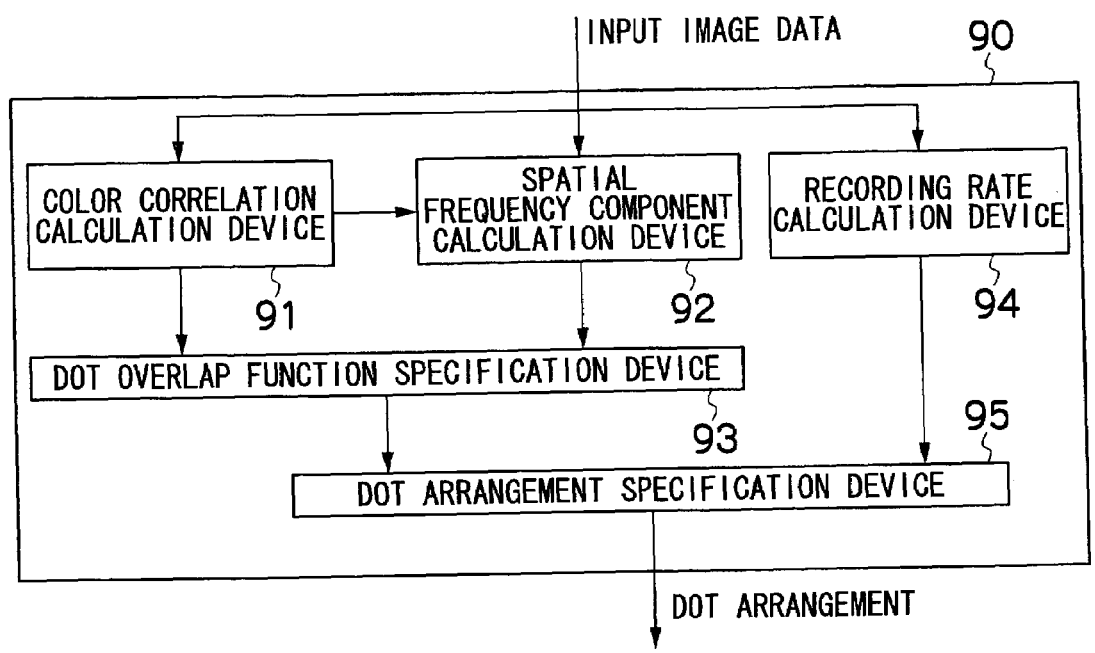
FIG. 6 is a block diagram showing the general composition of a first embodiment of the image processing unit illustrated in FIG. 5.

FIG. 6 is a block diagram showing the approximate composition of a first embodiment of the image processing unit 90. This first embodiment specifies the dot arrangement by using an error diffusion method. As shown in FIG. 6, the image processing unit 90 is constituted by a color correlation calculation device 91, a spatial frequency component calculation device 92, a dot overlap function specification device 93, a recording rate calculation device 94, and a dot arrangement specification device 95.

The color correlation calculation device 91 calculates color correlation values E for each of the pixels of the input image data (RGB). There is no particular restriction on the method of calculating the color correlation value $\epsilon$, and any commonly known color correlation value calculation method can be used.

For example, taking Y=(R+G+B)/3, it is possible to calculate the color correlation value $\epsilon$ by means of the following equation (1):

$$\epsilon = 1/(|R-Y|+|G-Y|+|B-Y|). \tag{1}$$

Alternatively, the color correlation value $\epsilon$ may be calculated by means of the following equation (2):

$$\epsilon = 1/(|R-G|+|B-G|). \tag{2}$$

Furthermore, the color correlation value $\epsilon$ may also be calculated by means of the following equation (3):

$$\epsilon = R \times G \times B / Y^3. \tag{3}$$

As yet a further alternative, the color correlation value $\epsilon$ may also calculated in the following manner. In other words, considering a mask of size m×m centered on each of the pixels, the color correlation values $\epsilon RG$, $\epsilon GB$, $\epsilon BR$ corresponding to respective two-color combinations of the colors red (R), green (G) and blue (B), are determined respectively by means of the following equation (4), and these values are added together in the following equation (5), in order to calculate the correlation value ϵ:

$$\epsilon RG = \{1/(2m+1)^2\}\Sigma_{ij}(R_{i,j} \times G_{i,j}),$$

$$\epsilon GB = \{1/(2m+1)^2\}\Sigma_{ij}(G_{i,j} \times B_{i,j}),$$

$$\epsilon BR = \{1/(2m+1)^2\}\Sigma_{ij}(B_{i,j} \times R_{i,j}), \quad (4)$$

where the sum $\Sigma$ is found by taking $-m$ to $+m$ as the values of i and j; and $$\epsilon = \epsilon RG + \epsilon GB + \epsilon BR. \quad (5)$$

In this case, when finding the product sum for each color pair in the equation (4), the respective pixel values of $R_{i,j}$, $G_{i,j}$, and $B_{i,j}$ may determined as correlation values for a particular frequency band, by using a low-pass filter to separate the input image signal into frequency bands, for example, and then calculating the values corresponding to the particular frequency band (for example, the central frequency component).

Furthermore, the spatial frequency component calculation device 92 calculates the spatial frequency component for each color component, from the input image data. The spatial frequency component indicates the degree of change in the pixel values within a prescribed region of the image data, and it may be specified by means of a commonly known method based on deriving a Fourier transform of the input image data. The method is not limited to a Fourier transform, and other commonly known methods of calculating the spatial frequency component may also be applied.

The dot overlap function specification device 93 specifies a dot overlap function according to the color correlation values calculated by the color correlation calculation device 91 and the spatial frequency components calculated by the spatial frequency component calculation device 92. The dot overlap function is used to decide the dot arrangements, namely, how the ink dots are to be arranged, for the second ink component onwards, as described hereafter. The dot overlap function specification device 93 specifies the dot overlap function by means of a previously established dot overlap function specification table, in accordance with the magnitude level of the color correlation value, and the magnitude level of the spatial frequency.

FIG. 7 shows one example of a dot overlap function specification table. As shown in FIG. 7, the color correlation and the spatial frequency are set respectively to three magnitude levels: low, mid and high. A high color correlation corresponds to gray and a low color correlation corresponds to a chromatic color. Furthermore, the spatial frequency is divided into a low frequency component, a medium frequency component and a high frequency component. The dot overlap function is a function which indicates a probability of overlap between ink dots, f(x,y) (where $0 \leq f(x,y) \leq 1$) for each of the pixels (x,y) in the coordinate plane of the image. Therefore, the dot overlap function f(x,y) forms a curved surface which indicates the distribution of the probability of overlap between dots in the respective pixel on the coordinate plane of the image.

The dot overlap function is set to three states, state 1, state 2 and state 3, according to the combination of the color correlation and spatial frequency values. Here, state 1 indicates a case where the dots probably do not overlap, state 2 indicates a case where the dots probably overlap partially, and state 3 indicates a case where dots probably overlap.

Figure 8A:
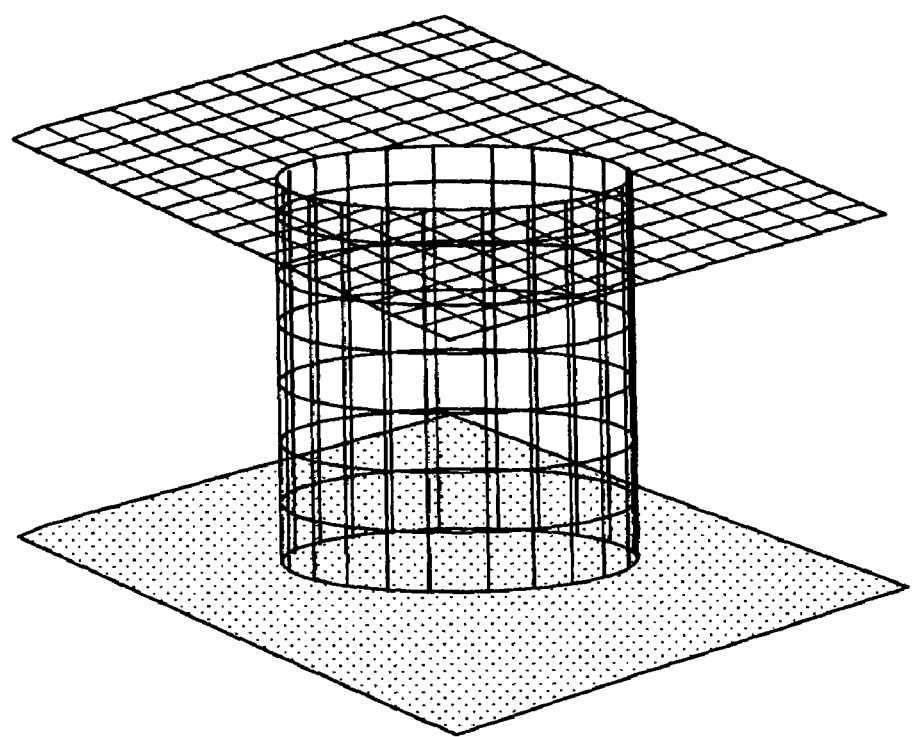
FIGS. 8A and 8B are illustrative diagrams showing an example of a dot overlap function in a case where dots are not overlapping.
Figure 8B:
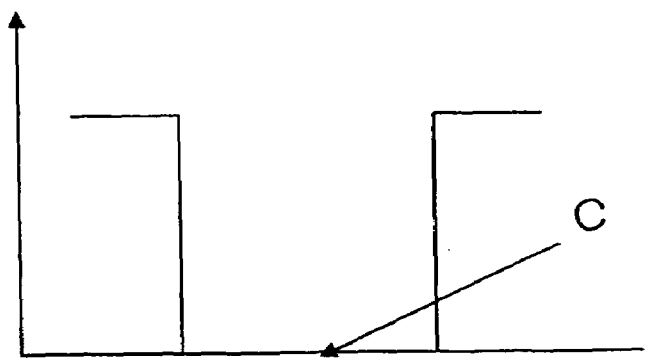

FIGS. 8A and 8B shows an example of a dot overlap function in a case where there is no overlapping of the dots, as in state 1. FIG. 8A is an oblique view of a probability distribution surface formed in the image coordinate plane by a dot overlap function in state 1, and FIG. 8B shows a cross-sectional view of same. In FIG. 8B, the horizontal axis represents the pixel and the vertical axis represents the probability (0–1). As the cross-sectional view in FIG. 8B reveals, in this case, the curved surface representing the dot overlap function indicates that the probability becomes zero and there is no overlap between dots, in the central region C which dips in a step shape. Therefore, for an ink component of a particular color, if the dipped central region C of the dot overlap function indicating state 1 coincides with the pixel under examination, then since the probability is 0 in this central region C, a dot of that color of ink will not overlap with the dot of the pixel under examination, even if it is located in the vicinity of the pixel under examination.

The example of the dot overlap function shown in FIGS. 8A and 8B is suitable for use when it is necessary to separate dots by a precise uniform distance. This dot overlap function is used in cases where, due to the combination of the medium and the ink, interference will occur between the inks if the dots are completely overlapping. By setting a suitable distance from the central dipped section to the surrounding raised sections, this function is used to make dots overlap in cases where problems may arise if there is complete overlap between dots. Furthermore, it is necessary to specify the scale of the horizontal axis (position/coordinates) of the dot overlap function, in accordance with the dot size and the amount of dot bleeding.

Figure 9A:
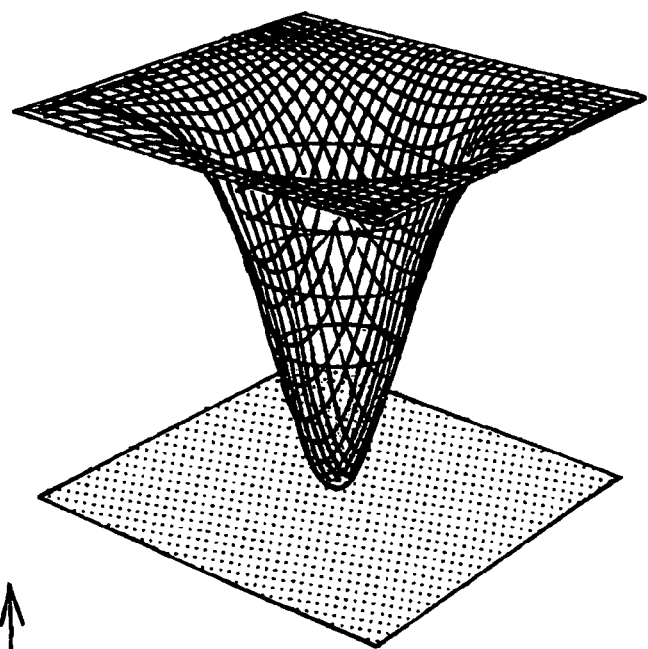
FIGS. 9A and 9B are illustrative diagrams showing an example of a dot overlap function in a case where dots are partially overlapping.
Figure 9B:
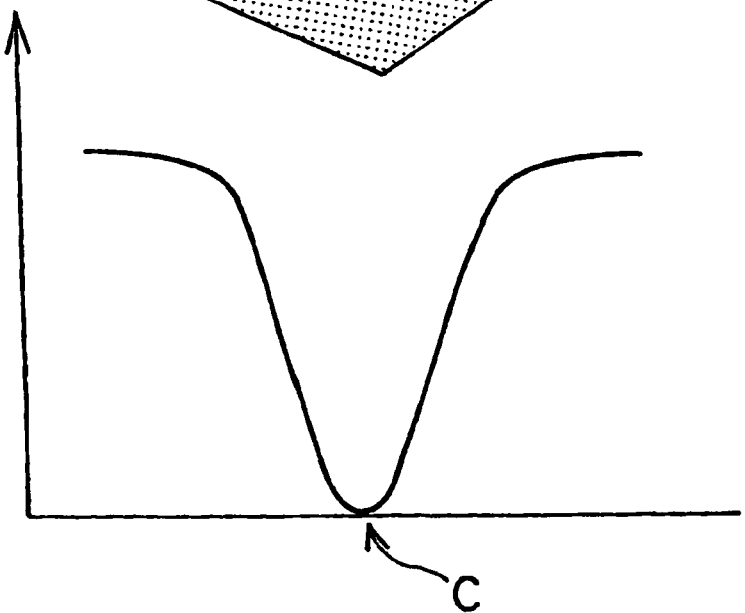

Furthermore, FIGS. 9A and 9B shows an example of a dot overlap function in a case where dots are partially overlapping, as in state 2. FIG. 9A is an oblique view of a probability distribution surface formed in the image coordinate plane by a dot overlap function in state 2, and FIG. 9B shows a cross-sectional view of same. As FIG. 9B reveals, in this case, in the center region C, the probability of overlap between dots is zero, but in the vicinity of the center region C, the probability of overlap between dots increases much sooner than the case shown in FIG. 8B. Accordingly, although dots do not overlap in the center region of the pixel under examination, there is partial overlap between dots in the vicinity of the center region.

Figure 10A:
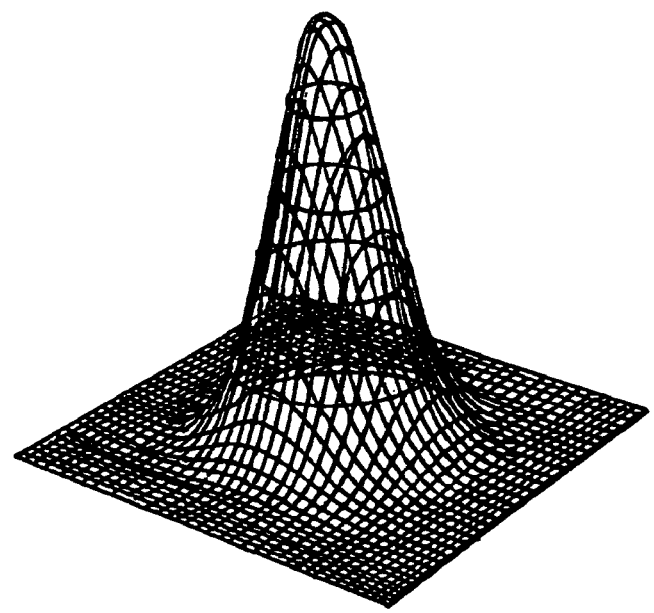
FIGS. 10A and 10B are illustrative diagrams showing an example of a dot overlap function in a case where dots are overlapping.
Figure 10B:
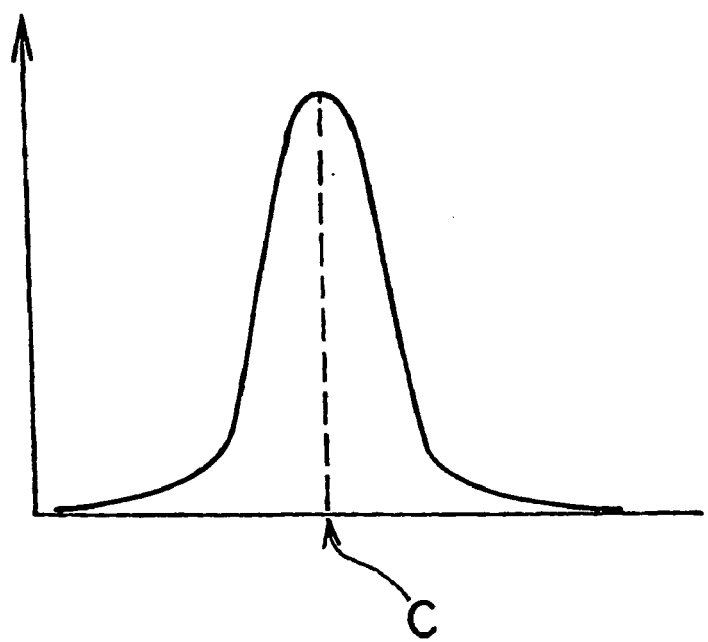

Furthermore, FIGS. 10A and 10B show an example of a dot overlap function in a case where dots are overlapping, as in state 3. FIG. 10A is an oblique view of a probability distribution surface formed in the image coordinate plane by a dot overlap function in state 3, and FIG. 10B shows a cross-sectional view of same. In this case, as FIG. 10B reveals, there is a high probability of overlap between dots in the central region C.

Using the table in FIG. 7, a state is selected from states 1 to 3 according to the color correlation and spatial frequency as shown in FIGS. 8A to 10B. However, a little further explanation of this process is given below.

If the input image is gray and the spatial frequency is in the low frequency region, then since the color correlation is high and the spatial frequency is a low frequency component, a dot overlap function which does not cause overlapping of dots, corresponding to state 1 in FIGS. 8A and 8B, is selected. From the second ink component onwards, the dot arrangement is specified according to this dot overlap function, in such a manner that there is no overlap in any of the respective ink components. Consequently, there is little white surface area that is not covered by dots and the respective ink dots are positioned in a distributed fashion, thus yielding an image of good granularity and tonal gradation.

Furthermore, if the input image is gray and of medium frequency, then since the color correlation is high and the spatial frequency is in the medium frequency region, a dot overlap function which causes the dots to be partially overlapping, corresponding to state 2 shown in FIGS. 9A and 9B, is selected. Since the dot arrangement is specified according to a function which creates dot overlap, from the second ink component onward, then all of the respective ink components will be partially overlapping. The surface area perceived as individual gray dots will be reduced to a certain degree and the respective ink dots will be distributed to a certain degree, thus yielding a good image which achieves both uniform tonal gradation and uniform resolution.

Furthermore, if the input image is gray and of high frequency, then since the color correlation is high and the spatial frequency is in the high frequency region, a dot overlap function which causes the to overlap, corresponding to state 3 shown in FIGS. 10A and 10B, is selected. Since the dot arrangement is specified according to this dot overlap function, from the second ink component onward, all of the respective ink components are overlapping, and the surface area perceived as individual gray dots is reduced (the white surface area is increased). Therefore, sharp edges can be reproduced clearly and an image of good resolution is obtained.

Furthermore, if the input image is of medium color saturation and low frequency, then since the color correlation is medium and the spatial frequency is in the low frequency region, a dot overlap function which does not cause the dots to overlap, corresponding to state 1 shown in FIGS. 8A and 8B, is selected. Since the dot arrangement is specified according to this dot overlap function from the second ink component onward, there is no overlap between any of the respective ink components. Consequently, there is little white surface area that is not covered by dots and the respective ink dots are positioned in a distributed fashion, thus yielding an image of good granularity and tonal gradation.

Furthermore, if the input image is of medium color saturation and of high frequency, then since the color correlation is high and the spatial frequency is in the medium frequency region, a dot overlap function which causes the dots to be partially overlapping, corresponding to state 2 shown in FIGS. 9A and 9B, is selected. Since the dot arrangement is specified according to this dot overlap function, from the second ink component onward, then all of the respective ink components will be partially overlapping. The surface area perceived as individual dots will be reduced to a certain degree and the respective ink dots will be distributed to a certain degree, thus yielding a good image which achieves both uniform color reproduction and uniform resolution.

Finally, if the input image is of high color saturation, then the color correlation will be low and hence a dot overlap function which causes no overlapping of the dots, corresponding to state 1 shown in FIGS. 8A and 8B, is selected. Since the dot arrangement is specified according to this dot overlap function from the second ink component onward, there is no overlap between any of the respective ink components. Consequently, there is little white surface area that is not covered by dots and the respective ink dots are positioned in a distributed fashion, thus yielding an image of good tonal gradation and color reproduction.

In the foregoing description, the color correlation and the spatial frequency values are divided respectively into three levels: low, medium and high, but there is no particular restriction on the way of dividing the values. To give concrete examples of these levels, the color correlation values can be divided as follows, for instance: the color correlation is high if the saturation is 1.5 or lower on a Munsell color chart, the color correlation is medium if the saturation is between 1.5 and 9 on a Munsell color chart, and the color correlation is low if the saturation is 9 or above on a Munsell color chart. As a possible alternative method of dividing the color correlation values, if an L*a*b* value obtained by converting the color correlation, or the a*b* plane forming an approximate yardstick thereof, is situated inside a circle of radius 3, then the color correlation is high, if the a*b* plane is situated outside a circle of radius 30, then the color correlation is low, and if the a*b* plane is situated within a radius of between 3 and 30, then the color correlation is medium.

The spatial frequency values can be divided into low, medium and high ranges as follows, for example. Namely, as an approximate yardstick, 0.2 (cycle/mm) or lower is taken to be a low spatial frequency, the range 0.2–3 (cycle/mm) is taken to be a medium spatial frequency, and the range of 3 (cycle/mm) and above is taken to be a high spatial frequency.

In this way, if the color correlation calculated from the input image data is of medium level and the similarly calculated spatial frequency is a high frequency component, then the dot overlap function illustrated in FIGS. 9A and 9B corresponding to state 2 is selected from the dot overlap function selection table shown in FIG. 7.

When specifying the dot overlap function by means of the dot overlap function specification table in FIG. 7, if the spatial frequency includes low-frequency, medium-frequency and high-frequency components, then it is judged to be a high-frequency component, and if the spatial frequency includes low-frequency and medium-frequency components, then it is judged to be a medium-frequency component.

Furthermore, if there are a plurality of main color components (R and G, G and B, B and R), then spatial frequency is judged by the average value of the main color components, for instance, (R+G)/2. Alternatively, it is also possible to divide up the respective color components according to frequency, and then judge the low, medium and high-frequency components for each color component, thus determining the spatial frequency for each color component.

Moreover, if R has medium spatial frequency and G has high spatial frequency, then the spatial frequency is judged to be a high-frequency level. The judgment criteria are prioritized in the order high-frequency>medium-frequency>low-frequency.

The recording rate calculation device 94 calculates the ink recording rate from the input image data. The ink recording rate means the volume of ink discharged within a particular region of the image. When a maximum volume of ink is discharged at every pixel position in the image region, then the ink recording rate is 100%. Ultimately, the ink recording rate corresponds to the ink density at a respective pixel.

In a case where a plurality of inks are used, the dot arrangement specification device 95 specifies the dot arrangement for the first ink component by means of a commonly known technique, such as error diffusion, and furthermore, it then calculates the dot arrangements for the other ink components from the second ink component onward, according to the dot arrangement and the dot overlap function already specified for the first ink component, and the ink recording rate for the other ink component (as calculated by the recording rate calculation device 94).

A case where the dot arrangement specification device 95 specifies the dot arrangement for a particular ink component (taken to be the "mth" ink component) is now described. Firstly, the dot arrangement for the first ink component is specified by error diffusion, and the dot arrangements for the second to the (m−1)th ink components are specified as described in the present invention. In the case of the mth ink component, the ink recording rate is calculated, the quantized error of the pixel under examination $(x_0, y_0)$ from the peripheral pixel $(x_p, y_q)$, which has previously been quantized, is specified, and a corrected tonal gradation value is determined. Furthermore, the dot overlap function f(s,t) is applied to the peripheral pixel $(x_i, y_j)$ of the pixel under examination, with respect to the arrangements of individual dots of the previously quantized first ink component to (m−1)th ink component, which are situated peripherally to the pixel under examination $(x_0, y_0)$.

In other words, the center region C of the dot overlap function f(s,t) as illustrated in FIG. 8A to FIG. 10B is made to coincide with the peripheral pixel $(x_i, y_j)$. In terms of the mathematical equation, this is equivalent to inserting $x_0-x_i$ and $y_0-y_j$ for s and t in the dot overlap function, f(s,t). When the dot overlap function $f(x_0-x_1, y_0-y_j)$ applied to the peripheral pixel $(x_i, y_j)$ is applied to each of the peripheral pixels, then the value of the following equation: $\Sigma_k \Sigma_i \Sigma_j f(x_0-x_i, y_0-y_j)$ is determined (where $\Sigma_k$ is the sum with respect to k, $\Sigma_i$ is the sum with respect to i, and $\Sigma_j$ is the sum with respect to j). In order that the probability takes a value between 0 and 1, this value is normalized by dividing by S, the sum of the numbers of peripheral pixels of each ink component where a dot is present and the peripheral pixel is actually used in the calculation. In other words, $\{\Sigma_k \Sigma_i \Sigma_j f(x_0-x_i, y_0-y_j)\}/S$, thus providing a dot overlap function value to be used for the mth ink component.

This value is converted by a characteristics function g for aligning the scale with a threshold value T, as follows, $g(\{\Sigma_k \Sigma_i \Sigma_j f(x_0-x_i, y_0-y_j)\}/S)$, and is added to the sum of the recording rate of the mth ink component and the error correction and dot overlap function for the mth ink calculated above, thus obtaining a value F, as indicated in the following equation (6):

$$F = (\text{recording rate of mth ink}) + \quad (6)$$
$$(\text{error correction of mth ink}) +$$
$$g\left(\left\{\sum_k \sum_i \sum_j f(x_0 - x_i, y_0 - y_j)\right\}/S\right).$$

This value of F is compared with the threshold value T.

When the value of F is compared with the threshold value T, if F>T, then a dot of the mth ink component is "on" for the pixel under examination, in other words, a dot of the mth ink component is placed at the position of the pixel under examination. Furthermore, if F≦T, then a dot of the mth ink component is "off" for the pixel under examination, in other words, a dot of the mth ink component is not placed at the position of the pixel under examination. In this way, the dot arrangement of the mth ink component is decided.

Here, if the threshold value is fixed and there is only one threshold value, then it may be set as T=((maximum value of image signal)−(minimum value of image signal))/2, for example. As is commonly known, a dithering matrix may also be used for the threshold value. It is also possible to apply a cyclical variation by multiplying the threshold value by a random number.

Rather than using the sum $\Sigma_k \Sigma_i \Sigma_j f(x_0-x_i, y_0-y_j)$ as the total of the dot overlap as described above, it is also possible to use the following product: $\Pi_k \Pi_i \Pi_j f(x_0-x_i, y_0-y_j)$.

In this case, a normalization coefficient is not required.

Figure 11A:
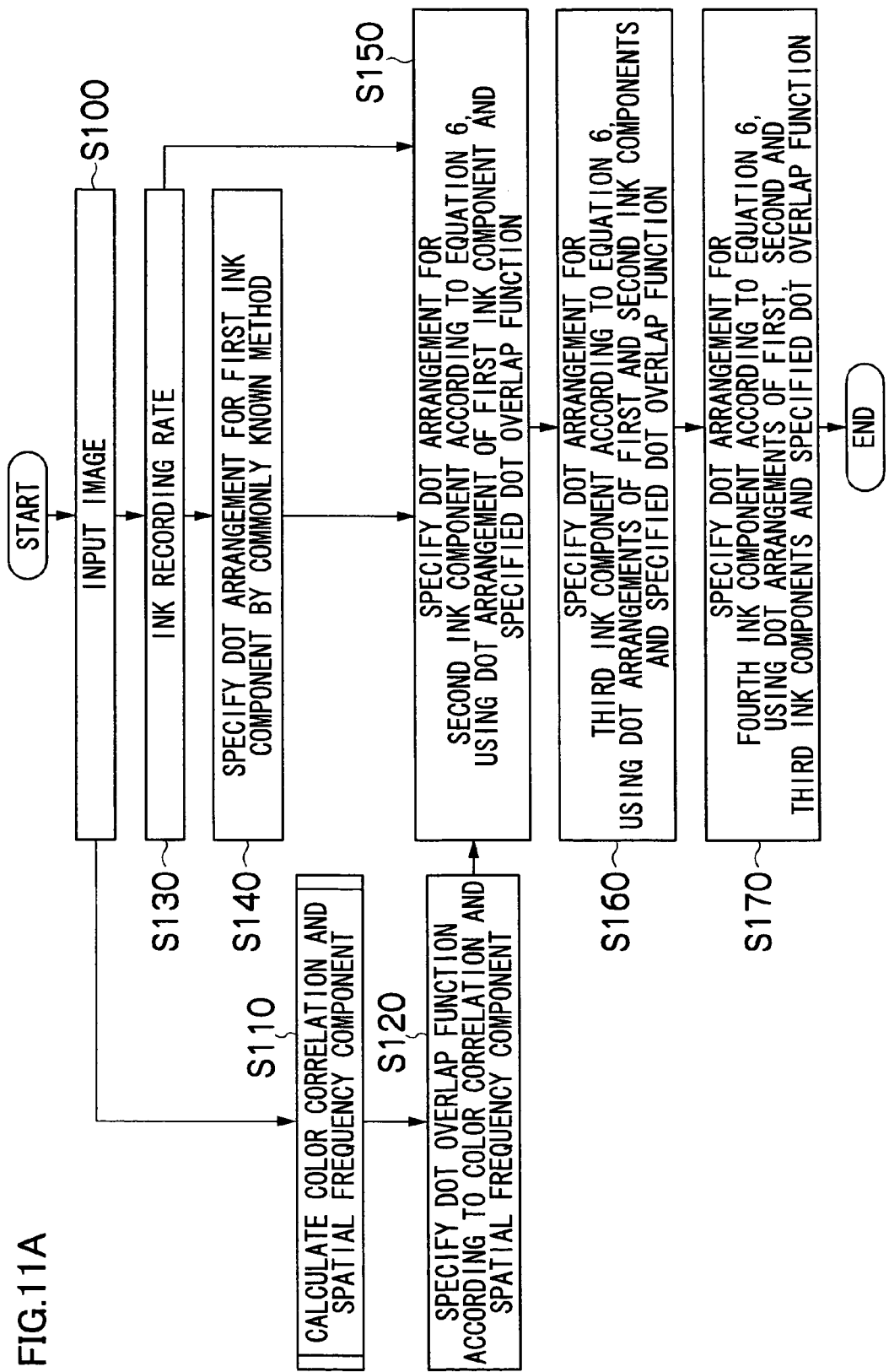
FIG. 11A is a flowchart illustrating the action of the first embodiment.

Next, the action of the first embodiment is described in accordance with the flowchart shown in FIG. 11A.

Firstly, at step S100 in FIG. 11A, the input image data is read into the image memory 74 via the communications interface 70, and is stored temporarily, after which it is subsequently called up from the image memory 74 by the system controller 72 and inputted to the image processing unit 90. When the input image data is inputted to the image processing unit 90, it is supplied respectively to the color correlation calculation device 91, the spatial frequency component calculation device 92 and the recording rate calculation device 94. The input image is divided up into a number of regions (blocks) for calculation purposes, and the following processing is carried out respectively for each block.

Next, at step S110, the color correlation calculation device 91 calculates the color correlation and the spatial frequency component calculation device 92 calculates the spatial frequency, according to the input image data. The calculation of the color correlation and the spatial frequency is performed in accordance with the color correlation and spatial frequency component calculation flow illustrated in FIG. 12.

Figure 12:
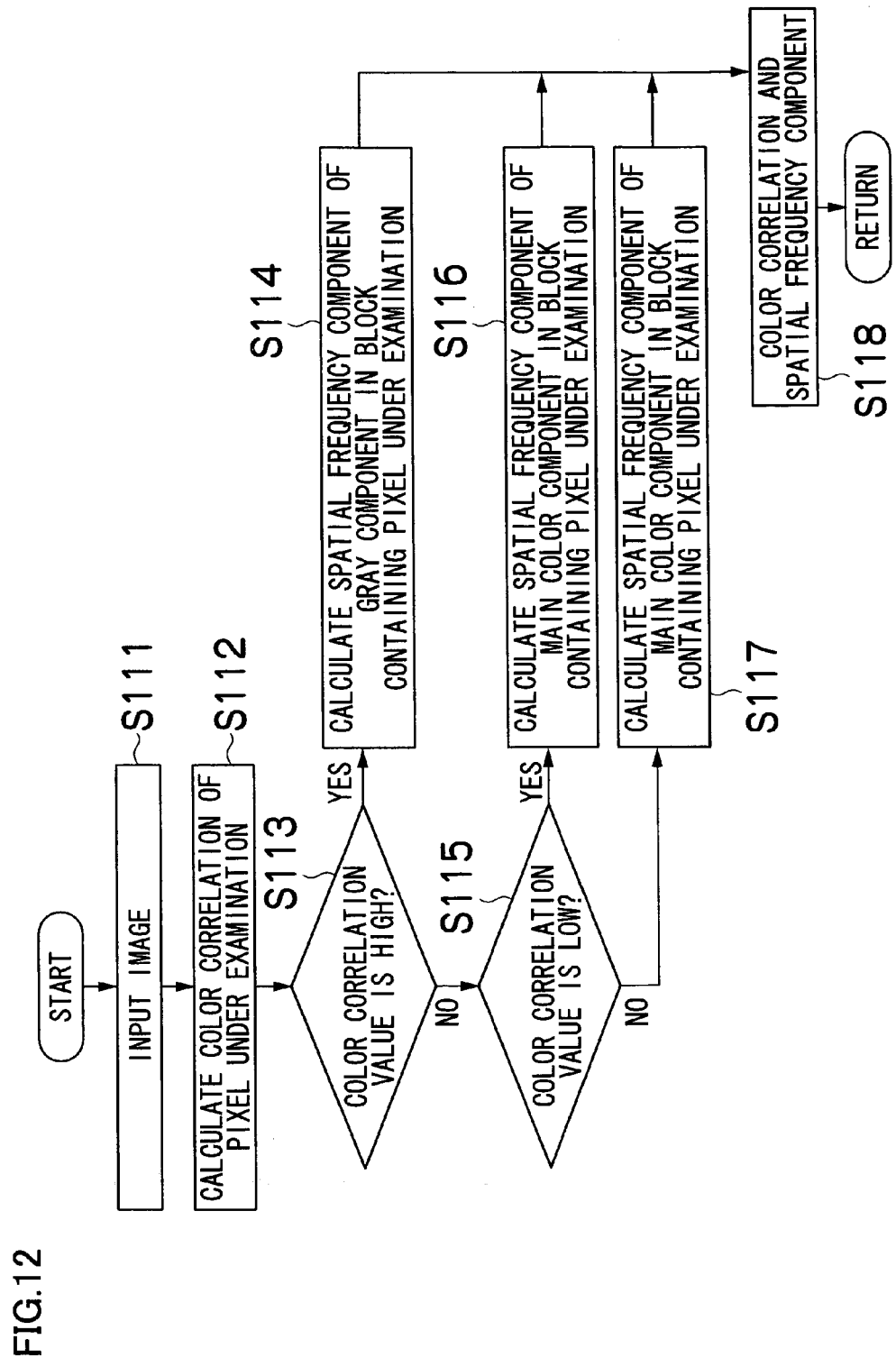
FIG. 12 is a flowchart showing a sub-routine for calculating the color correlation and spatial frequency component in the flowchart in FIG. 11A.

At step S111 of the flowchart in FIG. 12, when input image data is inputted respectively to the color correlation calculation device 91 and the spatial frequency component calculation device 92, firstly, at step S112, the color correlation of the pixel under examination is calculated by the color correlation calculation device 91. The color correlation is calculated by one of the methods described previously. The calculated color correlation value is supplied to the spatial frequency component calculation device 92 and the dot overlap function specification device 93.

Next, at step S113, the spatial frequency component calculation device 92 first judges whether or not the color correlation is high, by means of one of the methods described previously. If it judges that the color correlation is high, then at step S114, the spatial frequency component calculation device 92 calculates the spatial frequency of the gray component in a prescribed block including the pixel under examination.

Next, at step S115, the spatial frequency component calculation device 92 judges whether or not the color correlation is low, by means of one of the methods described previously. Here, if it judges that the color correlation is low, then at step S116, the spatial frequency component calculation device 92 calculates the spatial frequency of the main color component in a prescribed block including the pixel under examination.

Furthermore, if the color correlation is judged not to be low at step S115, then this means that the color correlation is a medium level, and at step S117, the spatial frequency component calculation device 92 calculates the spatial frequency of the main color component in a prescribed block including the pixel under examination.

The color correlation and spatial frequency values thus calculated are outputted to the dot overlap function specification device 93 at step S118.

Returning to the flowchart in FIG. 11A, at step S120, the dot overlap function specification device 93 specifies the dot overlap function according to the received color correlation and spatial frequency values. As described above, the dot overlap function is specified according to the levels (low, medium or high) of the color correlation and spatial frequency values, by using the dot overlap function specification table shown in FIG. 7.

On the other hand, at step S130, in parallel with the foregoing processing, the ink recording rate is calculated from the input image data by the recording rate calculation device 94, and at step S140, the dot arrangement specification device 95 specifies a dot arrangement for the first ink component according to the ink recording rate calculated above by the dot arrangement specification device 95.

Figure 13:
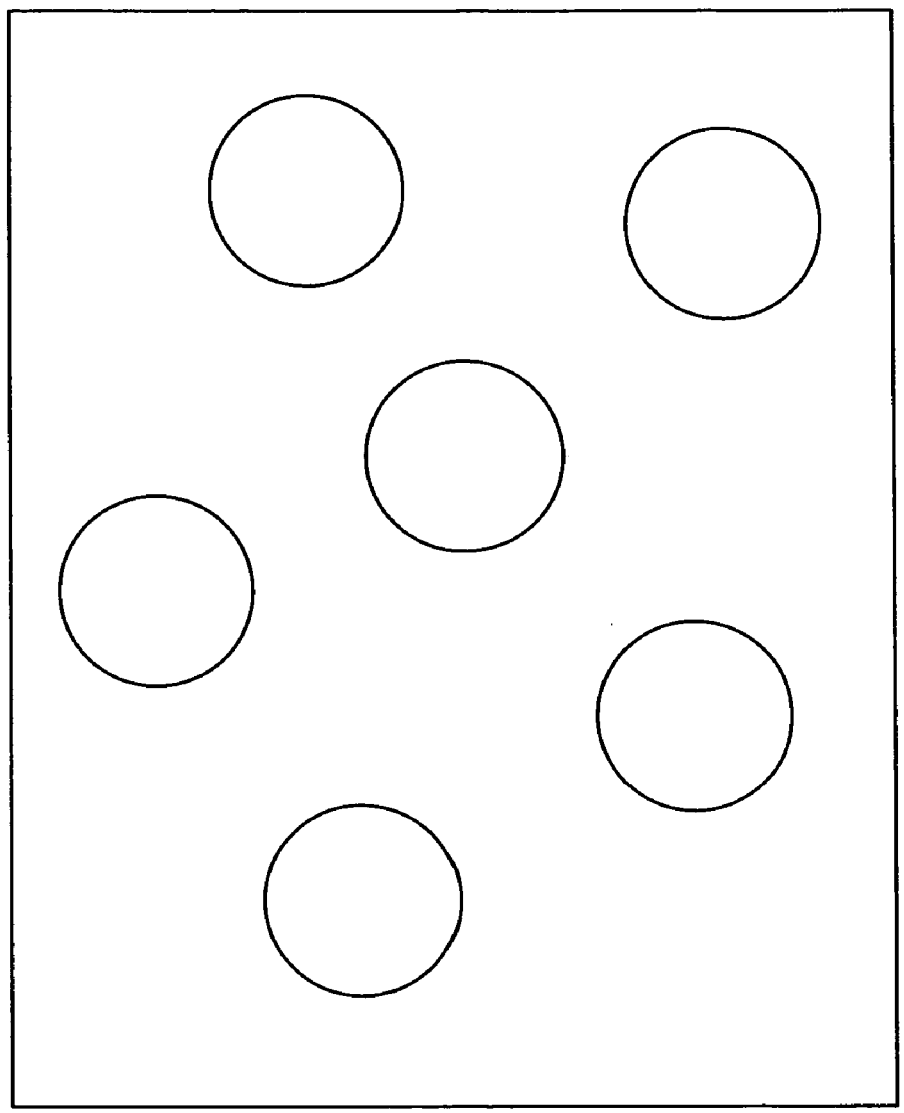
FIG. 13 is a plan diagram showing one example of a dot arrangement of the first ink component.

Here, the first ink component is the ink component which has the strongest visual impact. For instance, in the case of C, M, Y and K, the first ink component is M (magenta). The visual impact of the colors can be regarded as having the following order: M>C>Y. The dot arrangement for M (magenta) ink is specified by means of a commonly known method, such as error diffusion. FIG. 13 shows an example of the dot arrangement for the first ink component. As a method of arranging the dots of the first ink component, apart from error diffusion, it is also possible to use an average error minimization method or a conditional specification method, which are based on parallel concepts to error diffusion and maintain approximately uniform average values.

Figure 14:
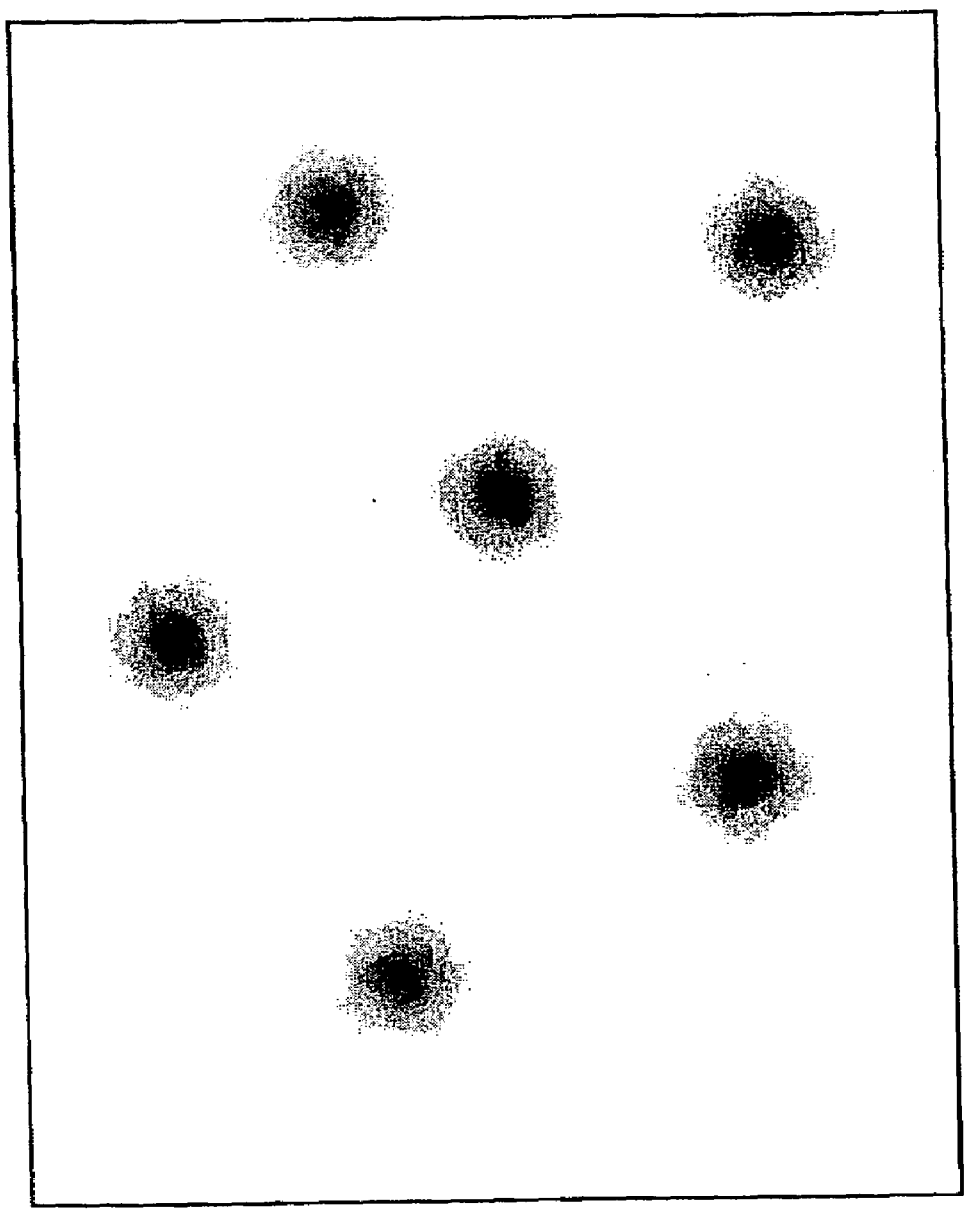
FIG. 14 is a plan diagram showing a situation where a dot overlap function in which dots are partially overlapping is applied to the dot arrangement of the first ink component in FIG. 13.

Next, at step S150, the dot arrangement specification device 95 specifies a dot arrangement for the second ink component, by comparing the threshold value T with the value F calculated by equation (6) as described above according to the dot arrangement of the first ink component and the dot overlap function specified above. For example, FIG. 14 shows a case where a dot overlap function such as that shown in FIGS. 9A and 9B is adopted with respect to the dot arrangement of the first ink component specified as shown in FIG. 13. In FIG. 14, the black regions are regions where no dots are present, and the white regions are regions where dots are present. Therefore, in this case, as shown in FIG. 13, the dots of the second ink component do not overlap with the regions where the dots of the first ink component are arranged.

The dot arrangement method is described again below, with respect to a case where the mth ink component explained above is applied to the second ink component. More specifically, in the case of the second ink component, the quantized error of the pixel under examination from a peripheral dot, which has previously been quantized, is specified, a corrected tonal gradation value is determined, and the total of the dot overlap functions $\{\Sigma_k \Sigma_i \Sigma_j f(x_0-x_i, y_0-y_j)\}/S$ is determined according to the arrangement of individual dots of the first ink component quantized previously, which are situated at the periphery of the pixel under examination. This total is converted by means of the characteristics function g, and the result, $g(\{\Sigma_k \Sigma_i \Sigma_j f(x_0-x_i, y_0-y_j)\}/S)$, is entered into the following equation (7) corresponding to the equation (6), in order to determine the value of F:

$$F = \text{(recording rate of second ink)} + \text{(error correction of second ink)} + g\left(\left\{\sum_k \sum_i \sum_j f(x_0-x_i, y_0-y_j)\right\}/S\right). \quad (7)$$

By setting k=2 in the equation (7), the dot arrangement of the second ink component is specified by comparing the value F with the threshold value T in order to determine whether or not a dot is present.

Next, at step S160, the dot arrangement for the third ink component is specified according to the equation (6), using the dot arrangements of the first ink component and the second ink component, and the specified dot overlap function.

Next, at step S170, the dot arrangement for the fourth ink component is specified according to the equation (6), using the dot arrangements of the first ink component, the second ink component, and the third ink component, and the specified dot overlap function.

The dot arrangements of the respective ink components specified in this way are supplied to the print controller 80, and under the control of the print controller 80, the print head 50 forms an image by discharging ink dots from the print head 50 onto the recording paper 16. In this way, by controlling dot overlap between the plurality of inks, it is possible to form an image which achieves both good image resolution and good tonal gradation.

Above, an embodiment has been described in which the dot arrangement is successively decided for the first to the kth ink components, by using a dot overlap function, but a sufficient beneficial effect is obtained if the dot arrangement is specified by using a dot overlap function in respect of only those ink components of the first to kth ink components which have a significant visual impact.

Furthermore, in the case described above, there are three states of overlapping between inks, but the present invention is not limited to this. The level of the color correlation and the spatial frequency is not limited to being divided into three categories. Furthermore, it is not necessary to calculate overlap for all of the ink components, but rather, overlap may be calculated for components having significant visual impact only.

For example, FIG. 11B shows a case where, in the example described according to the flowchart in FIG. 11A, the first ink component is the ink component having the greatest visual impact. In the flowchart shown in FIG. 11B, the lower three lines of the respective steps correspond to the steps in the flowchart in FIG. 11A, and since they are similar to FIG. 11A, description thereof is omitted here.

Figure 11C:
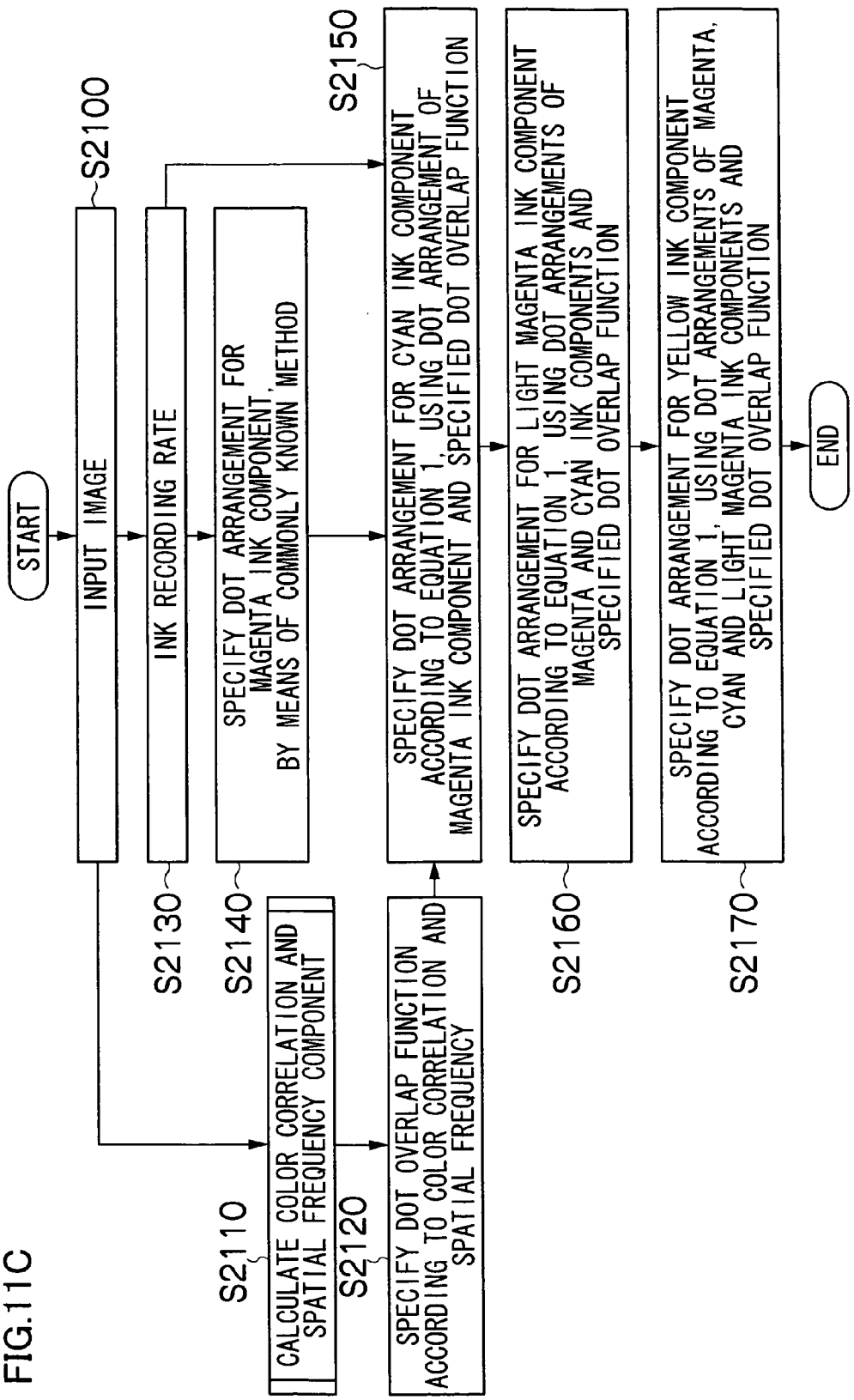
FIG. 11C is a flowchart showing an example of a case where the first ink component in FIG. 11A is taken to be the magenta ink component.

Moreover, FIG. 11C shows a case where, in the example shown in FIG. 11A, the first ink component is the magenta ink component. In this case, the second ink component is the cyan ink component, the third ink component is the light magenta ink component, and the fourth ink component is the yellow ink component. The other points are similar to the example shown in FIG. 11A.

Figure 11D:
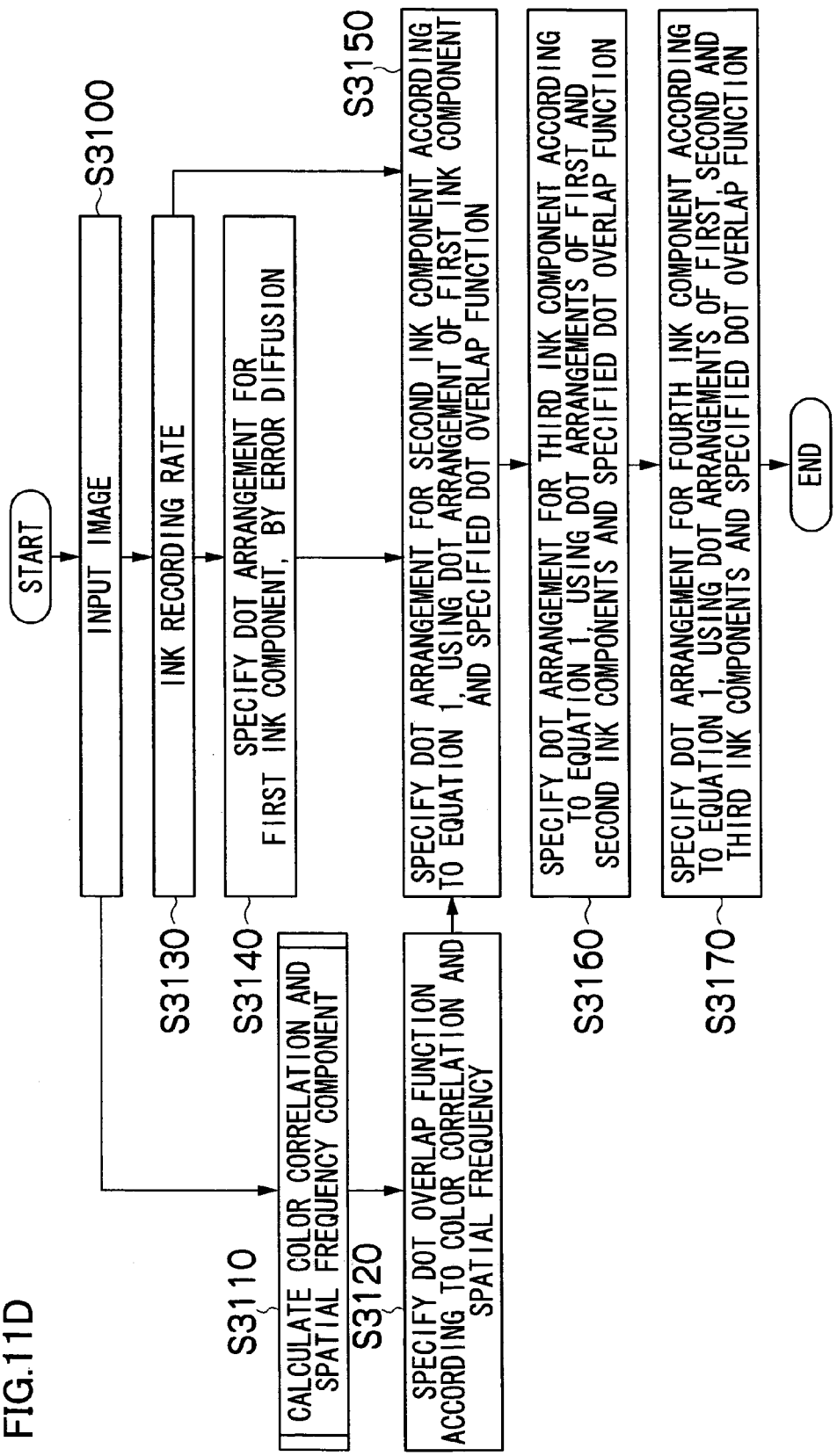
FIG. 11D is a flowchart showing an example of a case where the dot arrangement of the first ink component in FIG. 11A is specified by means of error diffusion.

Furthermore, FIG. 11D shows a case where, in the example in FIG. 11A, the dot arrangement of the first ink component is specified by means of error diffusion. In this way, by using error diffusion, it is possible to control the overlap between any of the inks, while maintaining average density.

Next, a second embodiment is described.

Figure 15:
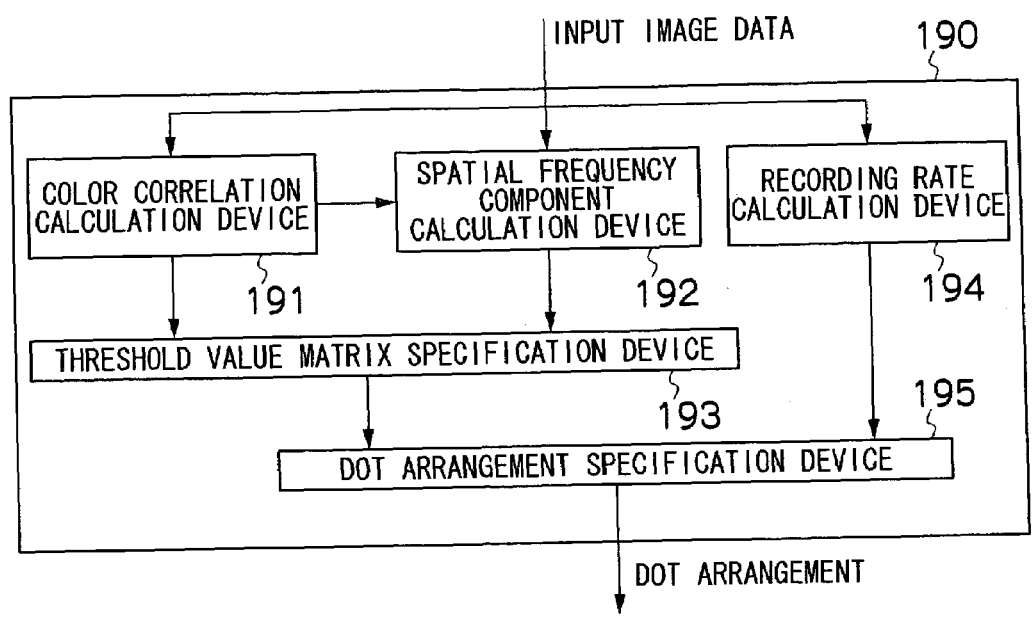
FIG. 15 is a block diagram showing the general composition of a second embodiment of an image processing unit.

FIG. 15 is a block diagram showing the approximate composition of an image processing unit 190 according to a second embodiment. As shown in FIG. 15, the image processing unit 190 of the present embodiment is constituted by a color correlation calculation device 191, a spatial frequency component calculation device 192, a threshold value matrix specification device 193, a recording rate calculation device 194, and a dot arrangement specification device 195.

The difference between this embodiment and the first embodiment described above lies in the fact that the threshold value matrix specification device 193 is provided instead of the dot overlap function specification device 93. In other words, the present embodiment decides the dot arrangement by using a threshold value matrix.

In the image processing unit 190 of the present embodiment, the color correlation calculation device 191, the spatial frequency component calculation device 192, and the recording rate calculation device 194 are all similar to those of the first embodiment described above, and detailed description thereof is omitted here.

The threshold value matrix specification device 193 decides the threshold value matrix for specifying the dot arrangement according to the color correlation calculated by the color correlation calculation device 191 and the spatial frequency calculated by the spatial frequency component calculation device 192. In other words, the threshold value matrix specification device 193 specifies the extent of dot overlap according to the spatial frequency characteristics and the color correlation of the block, and using a threshold value matrix specification table, it specifies a threshold value matrix corresponding to the extent of dot overlap according to the corresponding frequency (low, medium or high level) and color correlation.

FIG. 16 shows one example of a threshold value matrix specification table. The threshold value matrix specification table is a three-dimensional table which indicates a threshold value matrix for each combination of the respective levels of the color correlation and the spatial frequency. Here, similarly to the first embodiment described above, three levels, low, mid and high, are established respectively for the color correlation and the spatial frequency. Desirably, at least two levels are established for the color correlation value.

Furthermore, FIGS. 17A to 17C show examples of a threshold value matrix. FIG. 17A shows a low-frequency threshold value matrix LM, FIG. 17B show a medium-frequency threshold value matrix MM, and FIG. 17C show a high-frequency threshold value matrix HM.

In the present embodiment, for example, processing of the following kind is performed with respect to these threshold value matrices. For example, if the respective elements of the low-frequency threshold value matrix LM are taken to be $d(i,j)$, then a new low-frequency matrix LMA is obtained in which the respective $(i,j)$ elements are given by $da(i,j)=255-d(i,j)$ (mod 255). Here, (mod 255) indicates that a remainder method using 255 as the modulus is adopted, and this means that $da(i,j)$ is given by the remainder of dividing $255-d(i,j)$ by 255.

Similarly, a low-frequency matrix in which the $(i,j)$ elements are given by $db(i,j)=128+d(i,j)$ (mod 255) is taken to be matrix LMB, a low-frequency matrix in which the $(i,j)$ elements are given by $dc(i,j)=128-d(i,j)$ (mod 255) is taken to be matrix LMC, and a low-frequency matrix in which the $(i,j)$ elements are given by $dd(i,j)=64+d(i,j)$ (mod 255) is taken to be matrix LMD.

If the dots are overlapping, then LM is used for each of the respective ink components, C, M and Y. Furthermore, if the dots are not overlapping, then LM is used for the C ink component, LMA is used for the M ink component, and LMB is used for the Y ink component. Moreover, if the dots overlap to some extent, then LM is used for the C ink component, LMC is used for the M ink component, and LMD is used for the Y ink component.

A similar approach is adopted with respect to the medium-frequency threshold value matrix MM and the high-frequency threshold value matrix HM.

Figures 18A, 18B, 18C:
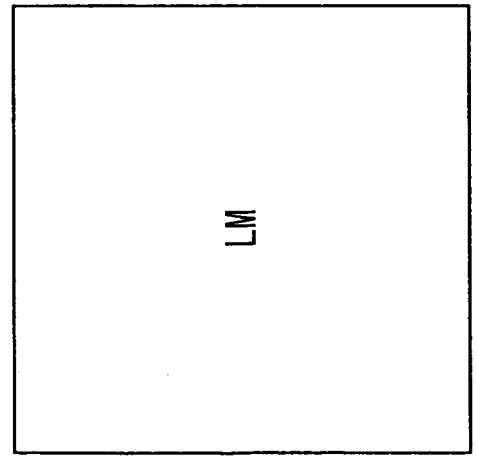

In the example shown in FIGS. 17A to 17C, the size of the low-frequency threshold value matrix LM is 8×8, the size of the medium-frequency threshold value matrix MM is 4×4, and the size of the high-frequency threshold value matrix HM is 2×2. Due to the difference in matrix sizes, the calculation process is complicated. Therefore, the 8×8 size of the low-frequency threshold value matrix LM shown in FIG. 18A is taken as a reference, and the medium-frequency threshold value matrix is set to a size of 8×8 by arranging two 4×4-size matrices MM, in the vertical and horizontal directions respectively, as depicted in FIG. 18B, while the high-frequency threshold value matrix is set to a size of 8×8 by arranging four 2×2-size matrices HM, in the vertical and horizontal directions respectively as depicted in FIG. 18C. In this way, calculations can be performed according to 8×8 matrices for all frequencies, and this improves the ease of calculation.

Furthermore, the dot arrangement specification device 195 specifies the dot arrangements for the respective ink components according to the ink recording rate calculated by the recording rate calculation device 194 and the threshold value matrix specified by the threshold value matrix specification device 193. As stated previously, the ink recording rate means the volume of ink discharged within a particular image region, and it corresponds to the density of that ink component in the corresponding pixels. The arrangement of the dots of the ink component is decided by comparing the ink recording rate with the respective elements (threshold values) of the threshold value matrix, and judging "dot on", if it is greater than the threshold value, and judging "dot off", if it is less than the threshold value.

Below, the action of the present example is described with reference to the flowchart in FIG. 19.

Figure 19:
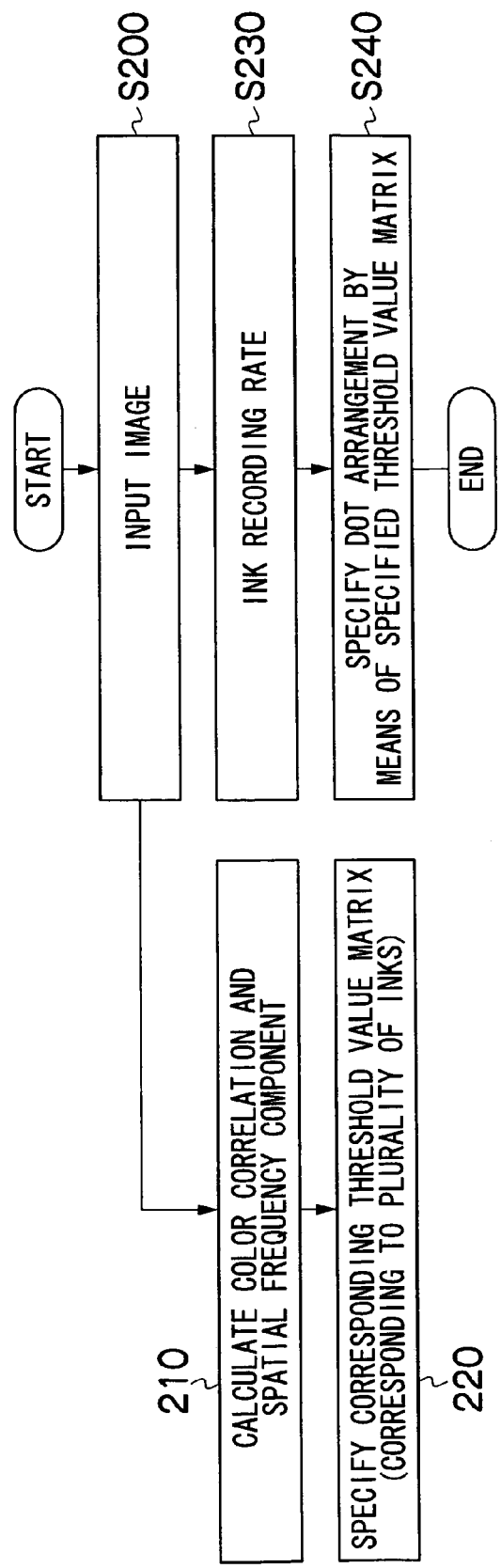
FIG. 19 is a flowchart illustrating the action of the second embodiment.

Firstly, in step S200 shown in FIG. 19, when input image data is supplied to the color correlation calculation device 191, the spatial frequency component calculation device 192 and the recording rate calculation device 194, at step S210, the ink recording rate is calculated by the color correlation calculation device 191, and the spatial frequency is calculated by the spatial frequency component calculation device 192. Furthermore, in parallel with this, at step S230, the ink recording rate is calculated by the recording rate calculation device 194. These processes are carried out in units of prescribed blocks of the input image and are similar to the first embodiment described above. Therefore, detailed description is omitted here.

Furthermore, at step S220, the corresponding threshold value matrix is specified from the color correlation and the spatial frequency, using the threshold value matrix specification table shown in FIG. 16, as described previously. The selected threshold value matrix corresponds to a plurality of inks. The specified threshold value matrix is supplied to the dot arrangement specification device 195.

Next, at step S240, the dot arrangement specification device 195 specifies the dot arrangement according to the ink recording rate and the threshold value matrix. More specifically, quantization within the block is performed according to the threshold value matrix for each ink component.

In accordance with the specified dot arrangements for each ink component, ink is discharged onto the recording paper 16 by the print head 50 under the control of the print controller 80, thereby recording an image onto the paper.

Next, a third embodiment of the present invention will be described.

Figure 20:
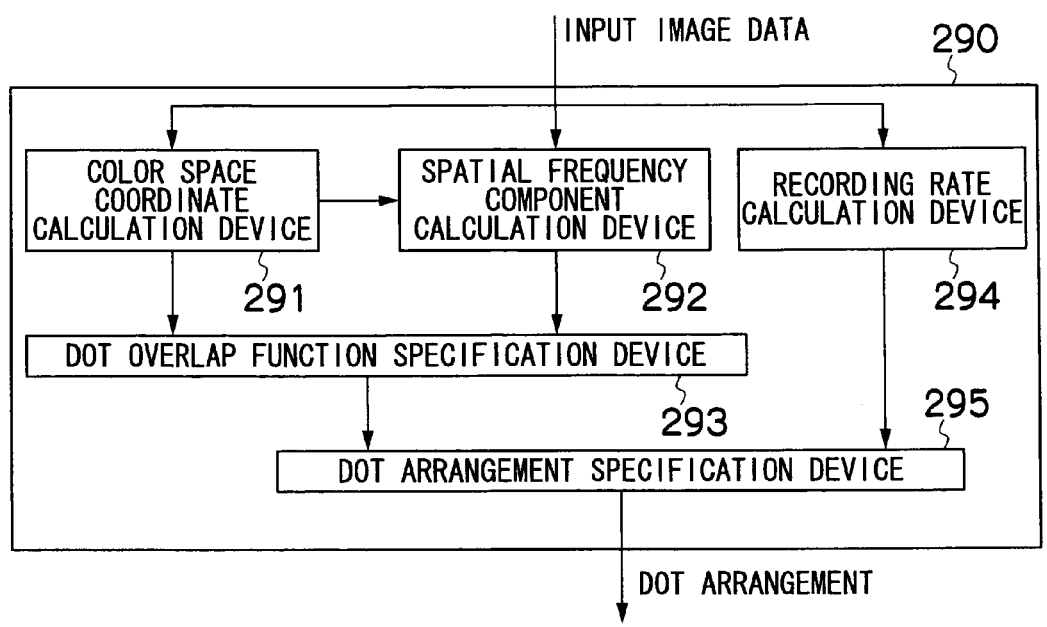
FIG. 20 is a block diagram showing the general composition of a third embodiment of an image processing unit.

FIG. 20 is a block diagram showing the approximate composition of an image processing unit according to a third embodiment. As shown in FIG. 20, the image processing unit 290 of the present embodiment is constituted by a spatial coordinate calculation device 291, a spatial frequency component calculation device 292, a dot overlap function specification device 293, a recording rate calculation device 294, and a dot arrangement specification device 295.

The present embodiment comprises a color space coordinate calculation device 291 instead of the color correlation calculation device 91 according to the first embodiment described above, and it specifies a dot overlap function according to the color space coordinates (L, a, b), rather than the color correlation.

The color space coordinate calculation device 291 converts the input RGB image data into color space coordinates (L, a, b) by means of a commonly known method. Furthermore, the color space coordinate calculation device 291 determines the color component used for judgment, in other words, which color of the colors, R, G and B, in the input image data is used to calculate the spatial frequency, from a three-dimensional table such as that illustrated in FIG. 21 which is defined in terms of the color space coordinates. The selected color component is reported to the spatial frequency component calculation device 292 and the dot overlap function specification device 293.

The spatial frequency component calculation device 292 determines the color component used for judgment from the color space coordinates (L, a, b) of the color component derived above, and it calculates the spatial frequency of this color component. The calculated spatial frequency is reported to the dot overlap function specification device 293.

The dot overlap function specification device 293 specifies the dot overlap function between the ink color components according to the color space coordinates and the spatial frequency, by using a dot overlap function specification table, which is a three-dimensional table defined in terms of the color space coordinates as illustrated in FIG. 21. When the dot overlap function is specified, similarly to the first embodiment described above, the dot arrangement specification device 295 specifies the dot arrangement of the ink component in question, by using the dot overlap function and the recording rate calculated by the recording rate specification device 294.

Below, the action of the present embodiment is described with reference to FIG. 22A.

Figure 22A:
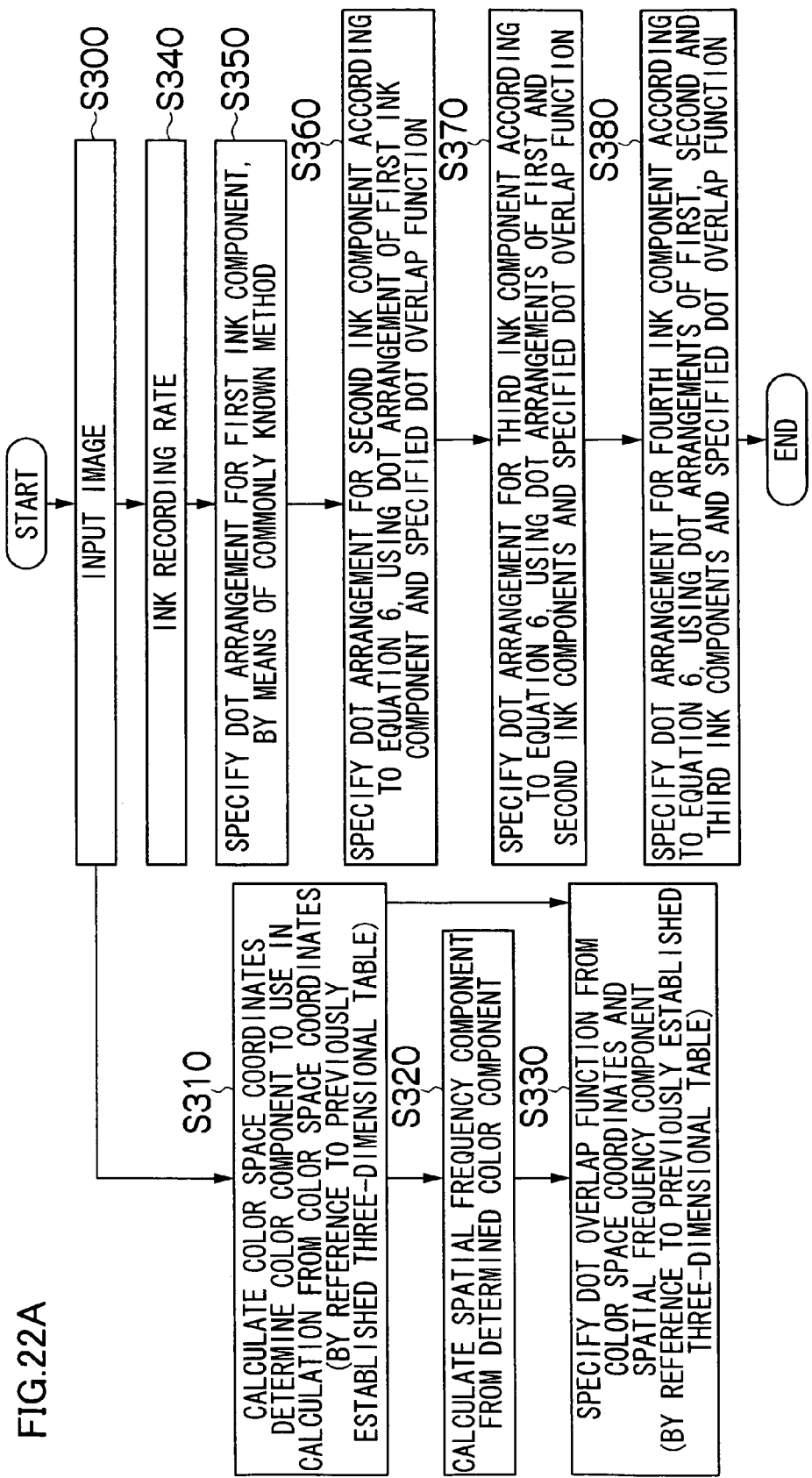
FIG. 22A is a flowchart showing the action of the third embodiment.

Firstly, in step S300 in FIG. 22A, when image data is inputted, in the next step, S310, the color space coordinate calculation device 291 calculates the color space coordinates (L, a, b) from the input image data, which is RGB data. Furthermore, it also finds the color component used for judgment, in other words, the color component for calculating the spatial frequency, from the three-dimensional table defined in terms of the color space coordinates (L, a, b) illustrated in FIG. 21.

Next, at step S320, the spatial frequency component calculation device 292 calculates the spatial frequency of the color component determined above. Thereupon, at step S330, the dot overlap function specification device 293 specifies a dot overlap function using the dot overlap function specification table illustrated in FIG. 21 according to the color space coordinates and the spatial frequency of the color component determined above.

On the other hand, at step S340, the recording rate calculation device 294 calculates the ink recording rate for the ink components of the respective colors, from the input image data. Furthermore, at step S350, the dot arrangement specification device 295 specifies the dot arrangement for the first ink component, by means of a commonly known technique, such as error diffusion, similarly to the first embodiment described above.

At step S360, similarly to the first embodiment, the dot arrangement specification device 295 specifies the dot arrangement for the second ink composition, according to equation (6) described above, by using the dot arrangement for the first ink component and the dot overlap function specified above.

Next, at step S370, the dot arrangement specification device 295 specifies the dot arrangement for the third ink component, according to the equation (6), by using the dot arrangement of the first ink component, the dot arrangement of the second ink component just specified, and the dot overlap function specified above.

Furthermore, at step S380, the dot arrangement specification device 295 specifies the dot arrangement for the fourth ink component, according to the equation (6), by using the dot arrangement of the first ink component, the dot arrangement of the second ink component, the dot arrangement of the third ink component, and the dot overlap function.

According to the dot arrangements for the respective ink components specified in this fashion, the print controller 80 controls the print head 50 via the head driver 84, thereby recording an image.

In the example in FIG. 22A, similarly to the first embodiment described above, the first ink component may be an ink component which has the strongest visual impact. FIG. 22B shows an example where the ink component having the strongest visual impact is used as the first ink component in this way. In the flowchart in FIG. 22B, the steps in the bottom three lines correspond to respective steps in FIG. 22A, and detailed description thereof is omitted here.

Furthermore, FIG. 22C shows a case where, in the example in FIG. 22A, the dot arrangement for the first ink component is decided by error diffusion.

Next, a fourth embodiment of the present invention will be described.

Figure 23:
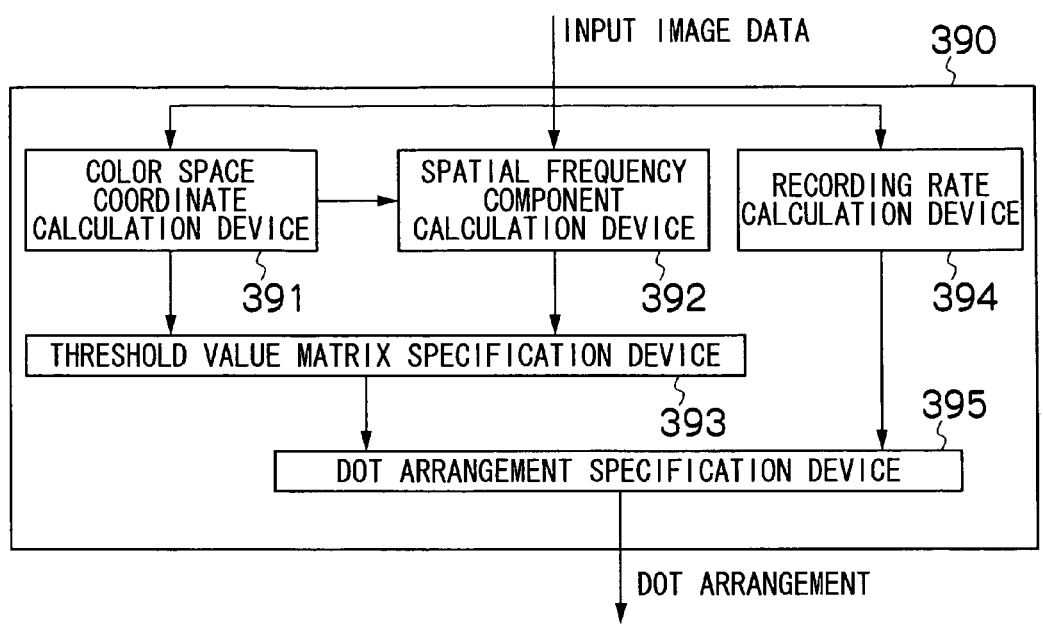
FIG. 23 is a block diagram showing the general composition of a fourth embodiment of an image processing unit.

FIG. 23 is a block diagram showing the approximate composition of an image processing unit according to a fourth embodiment. As shown in FIG. 23, the image processing unit 390 of the present embodiment is constituted by a color space coordinate calculation device 391, a spatial frequency component calculation device 392, a threshold value matrix specification device 393, a recording rate calculation device 394, and a dot arrangement specification device 395.

The present embodiment comprises a color space coordinate calculation device 391 instead of the color correlation calculation device 191 according to the second embodiment described above, and it specifies a threshold value matrix according to the color space coordinates (L, a, b), rather than the color correlation.

The color space coordinate calculation device 391 converts the input RGB image data into color space coordinates (L, a, b) by means of a commonly known method. Furthermore, the color space coordinate calculation device 391 determines the color component used for judgment, in other words, the color component whose spatial frequency is to be calculated, from a three-dimensional table such as that illustrated in FIG. 24 which is defined in terms of the color space coordinates. The selected color component is reported to the spatial frequency component calculation device 392 and the threshold value matrix specification device 393.

The spatial frequency component calculation device 392 calculates the spatial frequency for that color component from the color space coordinates (L, a, b) of the determined color component. The calculated spatial frequency is reported to the threshold value matrix specification device 393.

The threshold value matrix specification device 393 specifies the threshold value matrix according to the color space coordinates and the spatial frequency, by using a threshold value matrix specification table, which is a three-dimensional table defined in terms of the color space coordinates as illustrated in FIG. 24. When the threshold value matrix is specified, similarly to the second embodiment described above, the dot arrangement specification device 395 specifies the dot arrangement of the ink component in question, by using the threshold value matrix and the recording rate calculated by the recording rate specification device 394.

Below, the action of the present embodiment is described with reference to FIG. 25.

Figure 25:
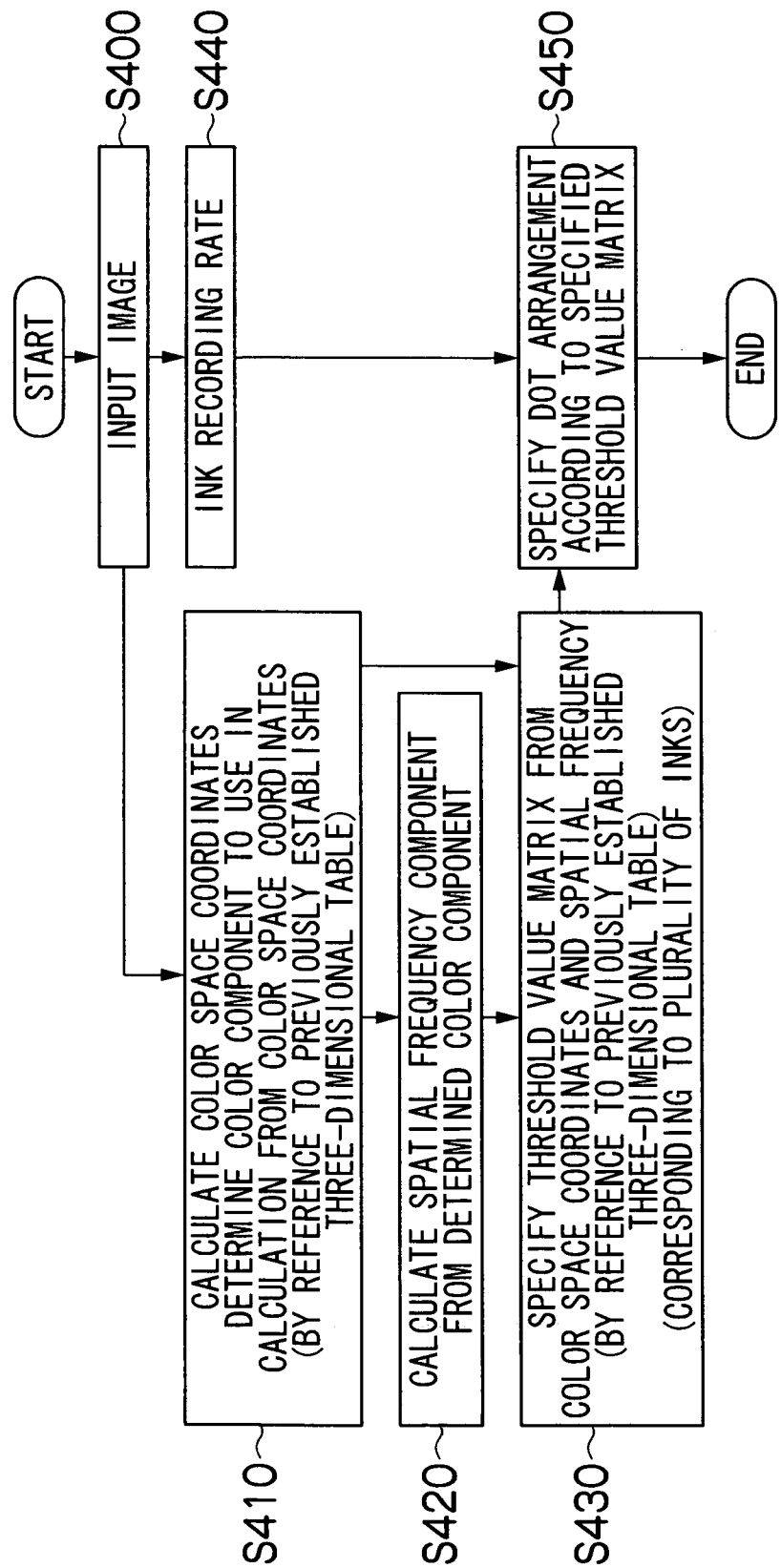
FIG. 25 is a flowchart illustrating the action of the fourth embodiment.

Firstly, in step S400 in FIG. 25, when image data is inputted, in the next step, S410, the color space coordinate calculation device 391 calculates the color space coordinates (L, a, b) from the input image data, which is RGB data. Furthermore, it also finds the color component used for judgment, in other words, the color component for calculating the spatial frequency, from the three-dimensional table defined in terms of the color space coordinates (L, a, b) illustrated in FIG. 24.

Next, at step S420, the spatial frequency component calculation device 392 calculates the spatial frequency of the color component determined above. Thereupon, at step S430, the threshold value matrix specification device 393 specifies a threshold value matrix using the threshold value matrix specification table illustrated in FIG. 24, according to the color space coordinates and the spatial frequency of the color component determined above.

On the other hand, at step S440, the recording rate calculation device 394 calculates the ink recording rate for the ink components of the respective colors, from the input image data. Furthermore, at step S450, the dot arrangement specification device 395 specifies a dot arrangement for the respective ink components, according to the ink recording rate and the threshold value matrix, similarly to the second embodiment.

According to the dot arrangements for the respective ink components specified in this fashion, the print controller 80 controls the print head 50 via the head driver 84, thereby recording an image.

As described above, in the present embodiments, the dot overlap function or the threshold value matrix is specified according to the spatial frequency characteristics or the color correlation of the image, and the dot overlap, in other words, the arrangement of dots, is controlled by means of this dot overlap function or threshold value matrix. Therefore, tonal gradation and image resolution can be achieved simultaneously in the recorded image, and hence an image of high quality can be obtained.

Furthermore, similarly, in the present embodiments, the dot overlap is controlled according to the frequency characteristics and the color space coordinates of the image, and therefore color reproduction, tonal gradation and image resolution can be achieved simultaneously.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing method for specifying dot arrangements for respective ink components according to image data, when forming an image on a recording medium by means of dots of inks of n colors, where n is any positive integer, the method comprising the steps of:
    calculating color correlation and spatial frequency components from the image data;
    specifying a dot overlap function for controlling overlapping between dots of the ink components, according to the calculated color correlation and spatial frequency components;
    calculating an ink recording rate of each of the inks from the image data;
    specifying the dot arrangement of a first ink component by means of a prescribed method, according to the ink recording rate; and
    determining a dot arrangement for the inks of the n colors, in such a manner that, taking k to be an integer where $2 \leq k \leq n$, the dot arrangement of the kth ink component is specified according to the ink recording rate of the kth ink component, and the previously specified dot arrangement and dot overlap function of the first ink component through to the (k−1)th ink component.

2. The image processing method as defined in claim 1, wherein the first ink component is an ink component of the color having a strongest visual impact.

3. The image processing method as defined in claim 1, wherein the first ink component is magenta.

4. The image processing method as defined in claim 1, wherein the prescribed method for specifying the dot arrangement of the first ink component is an error diffusion method.

5. An image processing method for specifying dot arrangements for respective ink components according to image data, when forming an image on a recording medium by means of dots of inks of n colors, where n is any positive integer, the method comprising the steps of:
    calculating color correlation and spatial frequency components from the image data;
    specifying a threshold value matrix corresponding to each of the ink components which controls the dot arrangement of each of the ink components according to the calculated color correlation and spatial frequency components;
    calculating an ink recording rate of each of the inks from the image data; and
    specifying a dot arrangement for each of the ink components according to the ink recording rate and the threshold value matrix.

6. An image processing method for specifying dot arrangements for respective ink components according to image data, when forming an image on a recording medium by means of dots of inks of n colors, where n is any positive integer, the method comprising the steps of:
    calculating color space coordinates and spatial frequency components from the image data;
    specifying a dot overlap function for controlling overlapping between dots of the ink components, according to the calculated color space coordinates and spatial frequency components;
    calculating an ink recording rate of each of the inks from the image data;
    specifying the dot arrangement of a first ink component by means of a prescribed method, according to the ink recording rate; and determining a dot arrangement for the inks of the n colors, in such a manner that, taking k to be an integer where $2 \leq k \leq n$, the dot arrangement of the kth ink component is specified according to the ink recording rate of the kth ink component, and the previously specified dot arrangement and dot overlap function of the first ink component through to the (k−1)th ink component.

7. The image processing method as defined in claim 6, wherein the first ink component is an ink component of the color having a strongest visual impact.

8. The image processing method as defined in claim 6, wherein the prescribed method for specifying the dot arrangement of the first ink component is an error diffusion method.

9. An image processing method for specifying dot arrangements for respective ink components according to image data, when forming an image on a recording medium by means of dots of inks of n colors, where n is any positive integer, the method comprising the steps of:
 calculating color space coordinates and spatial frequency components from the image data;
 specifying a threshold value matrix corresponding to each of the ink components which controls the dot arrangement of each of the ink components according to the calculated color space coordinates and spatial frequency components;
 calculating an ink recording rate of each of the inks from the image data; and
 specifying a dot arrangement for each of the ink components according to the ink recording rate and the threshold value matrix.

10. An image processing apparatus for specifying dot arrangements for respective ink components according to image data, when forming an image on a recording medium by means of dots of inks of n colors, where n is any positive integer, the apparatus comprising:
 a color correlation calculation device which calculates color correlation from the image data;
 a spatial frequency component calculation device which calculates spatial frequency components from the image data;
 a dot overlap function specification device which specifies a dot overlap function for controlling overlapping between dots of the ink components, according to the calculated color correlation and spatial frequency components;
 an ink recording rate calculation device which calculates an ink recording rate of each of the inks from the image data; and
 a dot arrangement specification device which specifies the dot arrangement of a first ink component by means of a prescribed method according to the ink recording rate, and the dot arrangement of the first ink component from the ink recording rate by means of a prescribed method, and specifies a dot arrangement for the inks of the n colors, in such a manner that, taking k to be an integer where $2 \leq k \leq n$, the dot arrangement of the kth ink component is specified according to the ink recording rate of the kth ink component, and the previously specified dot arrangement and dot overlap function of the first ink component through to the (k−1)th ink component.

11. An image processing apparatus for specifying dot arrangements for respective ink components according to image data, when forming an image on a recording medium by means of dots of inks of n colors, where n is any positive integer, the apparatus comprising:
 a color correlation calculation device which calculates color correlation from the image data;
 a spatial frequency component calculation device which calculates spatial frequency components from the image data;
 a threshold value matrix specification device which specifies a threshold value matrix corresponding to each of the ink components which controls the dot arrangement of each of the ink components according to the calculated color correlation and spatial frequency components;
 an ink recording rate calculation device which calculates an ink recording rate of each of the inks from the image data; and
 a dot arrangement specification device which specifies a dot arrangement for each of the ink components according to the ink recording rate and the threshold value matrix.

12. An image processing apparatus for specifying dot arrangements for respective ink components according to image data, when forming an image on a recording medium by means of dots of inks of n colors, where n is any positive integer, the apparatus comprising:
 a color space coordinate calculation device which calculates color space coordinates from the image data;
 a spatial frequency component calculation device which calculates spatial frequency components from the color space coordinates;
 a dot overlap function specification device which specifies a dot overlap function for controlling overlapping between dots of the ink components, according to the color space coordinates and spatial frequency components;
 an ink recording rate calculation device which calculates an ink recording rate of each of the inks from the image data; and
 a dot arrangement specification device which specifies the dot arrangement of a first ink component by means of a prescribed method according to the ink recording rate, and the dot arrangement of the first ink component from the ink recording rate by means of a prescribed method, and specifies a dot arrangement for the inks of the n colors, in such a manner that, taking k to be an integer where $2 \leq k \leq n$, the dot arrangement of the kth ink component is specified according to the ink recording rate of the kth ink component, and the previously specified dot arrangement and dot overlap function of the first ink component through to the (k−1)th ink component.

13. An image processing apparatus for specifying dot arrangements for respective ink components according to image data, when forming an image on a recording medium by means of dots of inks of n colors, where n is any positive integer, the apparatus comprising:
 a color space coordinate calculation device which calculates color space coordinates from the image data;
 a spatial frequency component calculation device which calculates spatial frequency components from the color space coordinates;
 a threshold value matrix specification device which specifies a threshold value matrix corresponding to each of the ink components which controls the dot arrangement of each of the ink components according to the color space coordinates and spatial frequency components;
 an ink recording rate calculation device which calculates an ink recording rate of each of the inks from the image data; and a dot arrangement specification device which specifies a dot arrangement for each of the ink components according to the ink recording rate and the threshold value matrix.

14. An image forming apparatus, comprising the image processing apparatus as defined in claim 10.

15. An image forming apparatus, comprising the image processing apparatus as defined in claim 11.

16. An image forming apparatus, comprising the image processing apparatus as defined in claim 12.

17. An image forming apparatus, comprising the image processing apparatus as defined in claim 13.

* * * * *